US012675361B2

(12) United States Patent
Jhaveri et al.

(10) Patent No.: US 12,675,361 B2
(45) Date of Patent: Jul. 7, 2026

(54) CONTROLLER-LEVEL MEMORY REPAIR

(71) Applicant: Micron Technology, Inc., Boise, ID (US)

(72) Inventors: Smruti Subhash Jhaveri, Boise, ID (US); Hyun Yoo Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 240 days.

(21) Appl. No.: 18/521,600

(22) Filed: Nov. 28, 2023

(65) Prior Publication Data

US 2024/0176697 A1 May 30, 2024

Related U.S. Application Data

(60) Provisional application No. 63/385,451, filed on Nov. 30, 2022.

(51) Int. Cl.
*G06F 11/10* (2006.01)
*G06F 13/42* (2006.01)

(52) U.S. Cl.
CPC ...... *G06F 11/1016* (2013.01); *G06F 11/1068* (2013.01); *G06F 13/4221* (2013.01)

(58) Field of Classification Search
CPC ............. G06F 11/1016; G06F 11/1068; G06F 13/4221; G11C 29/808; G11C 29/81
USPC ........................................................ 714/764
See application file for complete search history.

(56) References Cited

U.S. PATENT DOCUMENTS

| | | | | | |
|---|---|---|---|---|---|
| 11,175,984 | B1* | 11/2021 | Lercari | ................. | G06F 11/108 |
| 2004/0003336 | A1* | 1/2004 | Cypher | ................. | G11C 29/42 |
| | | | | | 714/763 |
| 2004/0088636 | A1* | 5/2004 | Cypher | ............... | G06F 13/1668 |
| | | | | | 714/E11.049 |
| 2014/0112085 | A1* | 4/2014 | Jeddeloh | ................. | G11C 7/10 |
| | | | | | 365/200 |

* cited by examiner

Primary Examiner — Albert Decady
Assistant Examiner — Enam Ahmed
(74) Attorney, Agent, or Firm — Colby Nipper PLLC

(57) ABSTRACT

Described apparatuses and methods facilitate sharing redundant memory portions at a controller-level to enable memory repair between two or more memory blocks. Each memory die of multiple memory dies can include, for instance, multiple spare rows for use if a row of a memory array has a faulty bit. If a memory die has more faults than spare rows, the memory die cannot repair the additional faults. This document describes a controller that can inventory unrepaired faults and available spare rows across multiple memory dies. The controller can then "borrow" a spare row from a second memory die that has an available one and "share" the spare row with a first memory die that has a fault than it cannot repair. The controller can remap a memory access request targeting the row with the unrepaired fault in the first memory die to a spare row in the second memory die.

20 Claims, 11 Drawing Sheets

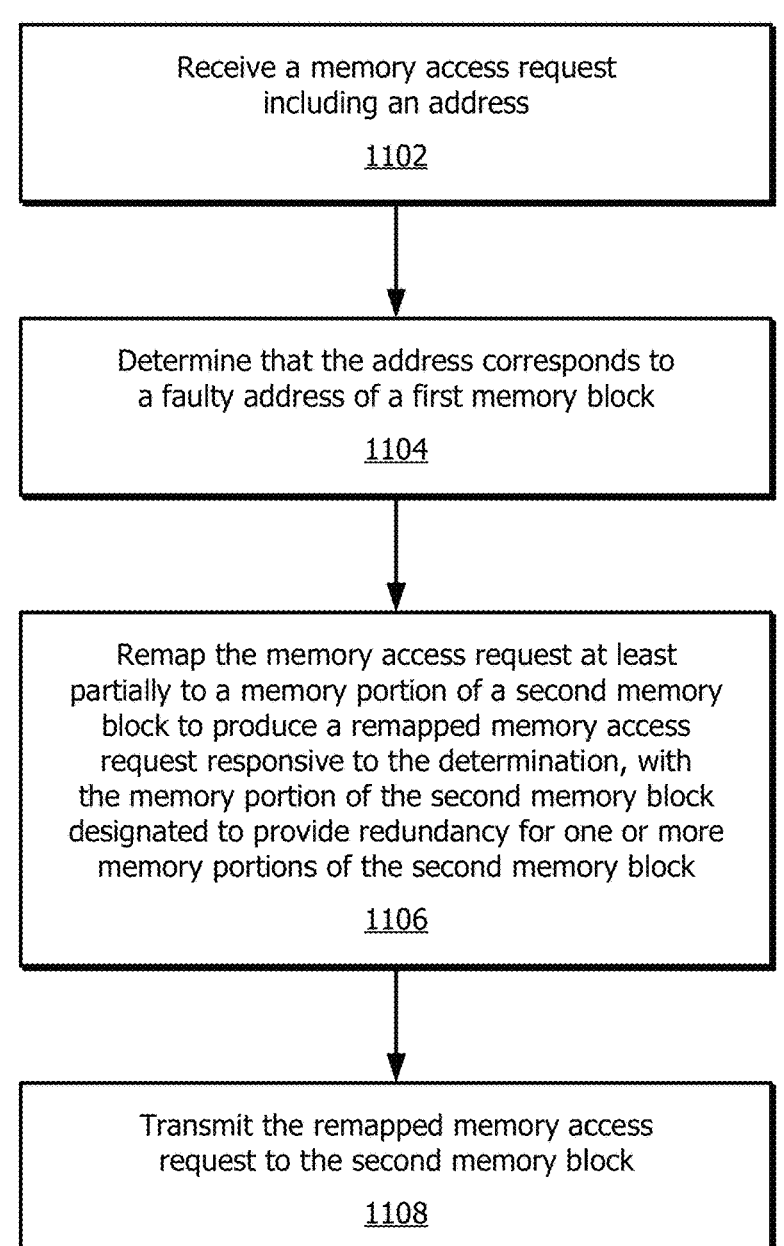

Receive a memory access request
including an address
1102

Determine that the address corresponds to
a faulty address of a first memory block
1104

Remap the memory access request at least
partially to a memory portion of a second memory
block to produce a remapped memory access
request responsive to the determination, with
the memory portion of the second memory block
designated to provide redundancy for one or more
memory portions of the second memory block
1106

Transmit the remapped memory access
request to the second memory block
1108

*FIG. 11*

CONTROLLER-LEVEL MEMORY REPAIR

CROSS-REFERENCE TO RELATED APPLICATION(S)

This application claims priority to U.S. Provisional Patent Application Ser. No. 63/385,451 filed on Nov. 30, 2022, the disclosure of which is incorporated by reference herein in its entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and nonvolatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for controller-level memory repair are described with reference to the following drawings. The same numbers are used throughout the drawings to reference like features and components:

FIG. 9 illustrates example data structures that map faulty addresses to respective repair indications;

FIG. 11 illustrates a flow diagram for example processes that implement aspects of controller-level memory repair from the perspective of a controller.

DETAILED DESCRIPTION

Overview

Figure 1:
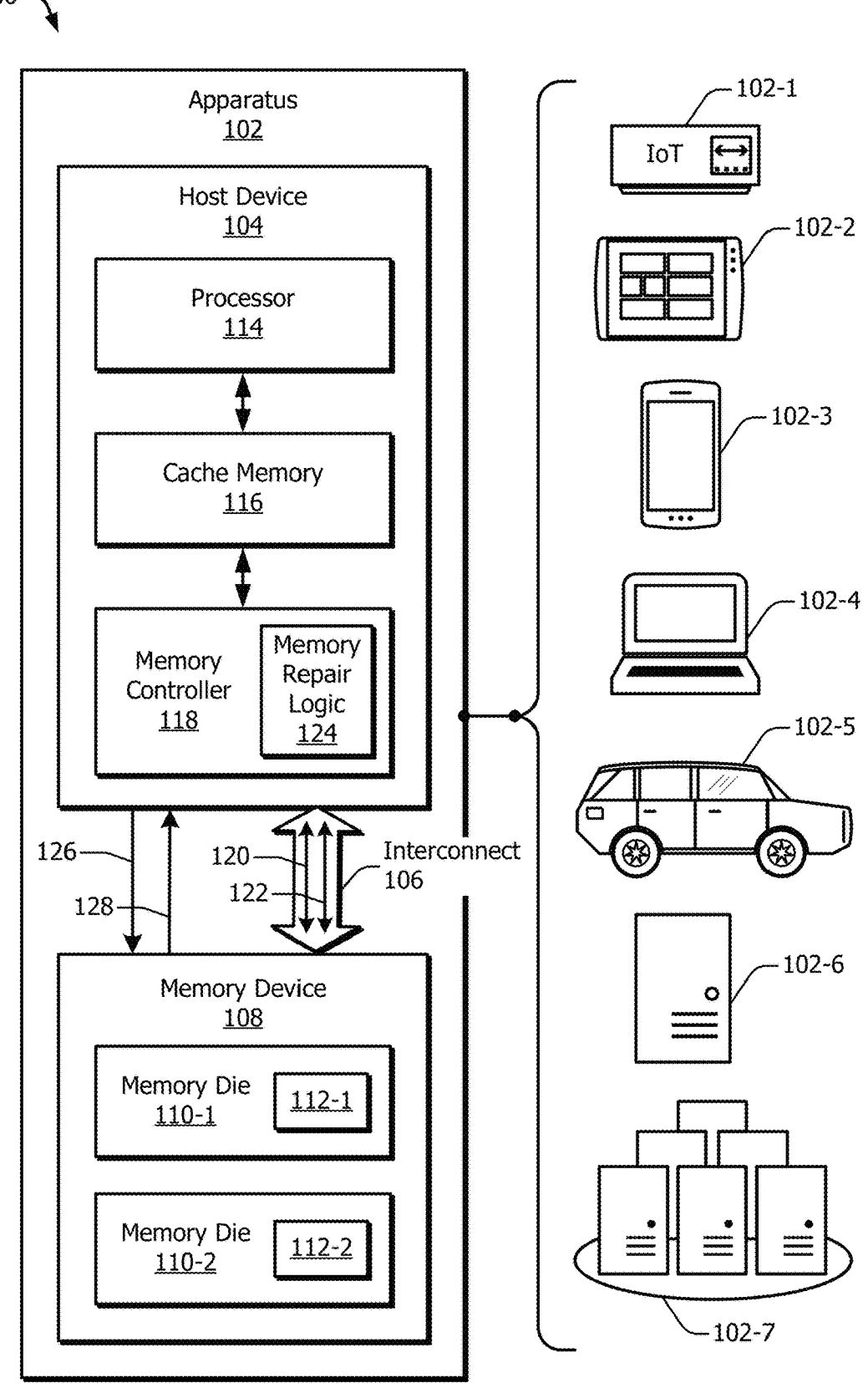
FIG. 1 illustrates example apparatuses that can implement aspects of controller-level memory repair.

Processors and memory work in tandem to provide features to users of computers and other electronic devices. An electronic device can provide enhanced features, such as high-resolution graphics or artificial intelligence, as a processor and memory operate more quickly together in a complementary manner. Some applications, like those for AI analysis and virtual-reality graphics, can also demand ever-greater amounts of memory. These applications use increasing amounts of memory to more accurately model and mimic human thinking and the physical world. These trends result in memory devices that contain increasing numbers of memory dies, each of which can have faults.

An individual memory die may be capable of repairing some quantity of its own failed memory bits based on a finite quantity of internal redundant memory portions. If the quantity of memory failures, or faults, exceed the finite quantity of internal redundant memory portions, the memory die becomes unusable. An unusable memory die jeopardizes an entire memory device that may contain a dozen or more memory dies, which is a costly result. To counter such an expensive problem, this document describes controller-level memory repair solutions in which a controller can "borrow" an available redundant memory portion from one memory die and "loan" the redundant memory portion to another memory die that has exhausted its supply of internal redundant memory portions. This sharing of redundant memory portions can be accomplished by remapping a faulty address corresponding to one memory die to the available redundant memory portion of another memory die. Accordingly, a memory device is much more likely to maintain a full memory capacity because a single relatively "high-fault" memory die need not undermine an entire memory device.

A memory die with more memory cells has more opportunities to experience a fault. Today's memory devices are fabricated with a significant quantity of memory cells, such as billions of memory cells within a single memory die, to accommodate applications and data sets that are increasingly larger. Given this significant quantity of memory cells, semiconductor manufacturing processes commonly introduce unintentional defects to one or more of the cells. For example, even in a tightly controlled manufacturing environment, a contamination may impinge one of the memory cells. As another example, a memory device design may demand that equipment used to manufacture the memory device operate at an edge of their process capability. Such operation of the equipment can lead to a critical dimension of one or more memory cells of the memory device failing to meet a target desired for reliable performance.

To help address these issues, memory device manufacturers can provide repair capabilities in a memory device, such as redundant memory portions, which are finite on a given integrated circuit (IC) chip. These redundant memory portions, which may correspond to redundant rows or columns of memory cells, may be linked to a memory array (e.g., a memory bank) within a memory die. During a testing operation, the memory device manufacturer may detect a defective memory cell within the memory array of the memory die. As part of compensating for the defect, the manufacturer may perform a repair operation internal to the memory die that, through a fusing operation that reroutes addressing within the memory die, effectively replaces a row or column containing the defective memory cell with an available redundant memory portion. Thus, the memory device manufacturer may use one or more of the finite quantity of redundant memory portions within a given memory die of the memory device.

Upon receiving the memory device from the memory device manufacturer, a memory device user (e.g., an original equipment manufacturer (OEM), an outsourced assembly-test (OSAT) service provider, or an end-user or consumer) may introduce additional defects. For example, the memory device user may introduce additional defects to the memory device through thermally induced damage during a solder-reflow operation while mounting the memory device to a printed circuit board (PCB). As another example, the memory device user may target an in-field use of the memory device for an application or environment that exceeds recommended operating thresholds (e.g., an application where a junction temperature of the memory device exceeds a threshold). Such an application or environment may prematurely damage or wear out memory cells of the memory device.

In some cases, memory device manufacturers can enable the memory device user to perform repair operations to compensate for defects that they may induce or that may otherwise occur over time. For instance, memory device designs for double-data rate (DDR) dynamic random-access memory (DRAM) may allow the memory device user to access post package repair (PPR) modes available on the memory device. The PPR modes can enable a memory device user to perform a repair operation like that performed by the manufacturer of the memory device within a single memory die.

In general, the memory device user can access a PPR mode to repair a memory die using signaling between a host device and the memory die. For example, a memory controller of the host device may signal a command, such as mode register write (MRW) command or a multi-purpose command (MPC), to the memory die. The command may include a set of one or more operands (e.g., at least one bit, including a combination or sequence of bits) that are written to a register (e.g., a mode register) of the memory die.

In response to the command, the memory die (e.g., operative logic included on the memory die) may process the command to determine (e.g., ascertain, establish, or set) a repair state of the memory die. The memory die may then write a second set of one or more operands, which are indicative of the repair state, to the register. The repair state may generally correspond to an availability status of redundant memory portions within the memory die (e.g., the availability of one or more redundant rows or columns of memory cells for a repair operation). Once in the repair state, a memory die of the memory device, in conjunction with a memory controller, may repair a faulty memory portion with a redundant memory portion within the same memory die.

Accordingly, a memory device manufacturer and a memory device user may each allocate one or more redundant memory portions to repair a corresponding quantity of faulty memory portions. After the finite quantity of redundant memory portions within a given memory die are allocated, no additional repairs can be performed on that memory die. Consequently, if another faulty memory portion in the memory die is discovered by the manufacturer or the user, the memory die becomes unusable.

Due to the cost of each memory die, this can become expensive even if the die is determined to be unusable before it is combined with other memory dies. Memory dies, however, are typically combined into a package or module with other memory dies. For example, eight IC chips with separate memory arrays can be mounted on a single PCB as a memory module. If one of the IC chips becomes unusable because it develops more faults than the IC chip has available redundant memory portions, the whole memory module may become unusable. Alternatively, the memory module may be marketed or used with an appreciably reduced memory capacity. Both outcomes are costly.

Additionally, unrepairable faults that are discovered by a memory device user while a memory device is installed in a machine can frustrate customers and result in warranty expenses for the memory device manufacturer or a computer-manufacturing partner. Further, some memory dies are installed in a memory device that includes one or more built-in memory controllers and front-end controller logic to interface with a communication interconnect, such as an interconnect that comports with a version of the Compute Express Link™ (CXL) protocol. Some of these memory device modules can include a dozen or more memory dies, which dramatically increases the probability that at least one memory die will exhaust all its onboard redundant memory portions. This can jeopardize the entire memory module or force the memory device manufacturer or user to reduce the usable memory size, sometimes by as much as half if a single memory die of many memory dies becomes unusable.

To expand the usability of redundant memory portions, this document describes controller-level memory repair. In certain implementations, at least some memory repair operations are accomplished using an inter-die mechanism. With an example inter-die mechanism, a memory controller uses a redundant memory portion from one memory die to repair, via substitution, a faulty memory location in another memory die. Each respective memory die includes one or more redundant memory portions, such as a spare row or a spare column—including a mixture of spare rows and spare columns in some cases. A given memory die can repair, possibly under the direction of a memory controller, one or more internal memory faults using the one or more redundant memory portions of the given memory die. An individual memory die may, however, be unable to repair more memory faults than a quantity of redundant memory portions that is possessed by the memory die. For instance, if a memory die possesses four redundant memory portions, then the memory die cannot repair a fifth fault.

To address, and at least partially remedy, such situations, a memory controller can remap memory accesses that would otherwise be transmitted to a faulty, unrepairable memory location on a first memory die to a redundant memory portion of a second memory die. To obtain appropriate repair information, the memory controller sends a request for repair information to multiple memory dies. Each memory die responds by sending the requested repair information to the controller. The repair information may include, for example, at least one faulty address that cannot be repaired using a memory die's own redundant memory portions. The repair information may also or instead include redundant data that characterizes a state of the redundant memory portions of the memory die. The state may indicate whether or how many redundant memory portions remain available within the die (e.g., zero, one, or five), a type of redundant memory portion (e.g., row, column, or flexible) that is available, an identifier of an available redundant memory portion for addressing or other accessing purposes, and so forth.

The memory controller uses the repair information from the multiple memory dies to produce a repair solution data structure. The repair solution data structure includes multiple entries. Each entry can include a faulty address that is associated with, or maps to, a repair indication. The repair indication provides an address to a second memory die to which a memory access can be directed instead of the associated faulty address for a first memory die. Thus, if the memory controller receives from an upstream component a memory access request that targets the faulty address of the first memory die, the controller can remap the memory access request to a redundant memory portion of the second memory die using an entry of the repair solution data structure.

Accordingly, this document describes hardware and techniques for controller-level memory repair that expands the repair capabilities of a memory device. If a first memory die exhausts its supply of redundant memory portions, the memory device need not be scrapped or have its memory capacity reduced. Instead, a memory controller can "borrow" a redundant memory portion from a second memory die by making the borrowed redundant memory portion available to service memory access requests that would otherwise be directed to a faulty memory location of the first memory die, which memory fault the first memory die is unable to repair with its own exhausted internal redundant memory portions. This expanded, inter-die repair capability can save production costs as fewer memory dies may be rendered unusable by fabrication faults present within a single memory die. This expanded repair capability can also reduce warranty expenses for manufacturers because memory devices become more robust and resilient to memory faults. Controller-level memory repair can additionally reduce frustration and inconveniences to memory device users.

These and other implementations and advantages are described herein. Further, although some implementations are described above in terms of a memory controller and individual memory dies, in other implementations a controller that is part of a memory subsystem may interact with memory blocks generally, such as memory channels, memory ranks, memory dies, or memory banks. Controller-level memory repair enables redundant memory portions to be shared across such memory blocks.

Example Operating Environments

FIG. 1 illustrates, at 100 generally, example apparatuses 102 that can implement aspects of controller-level memory repair. The apparatus 102 can be realized as, for example, at least one electronic device. Example electronic-device implementations include an internet-of-things (IoTs) device 102-1, a tablet device 102-2, a smartphone 102-3, a notebook computer 102-4 (or a desktop computer), a passenger vehicle 102-5 (or other vehicle), a server computer 102-6, a server cluster 102-7 that may be part of cloud computing infrastructure or a data center, and any portion thereof (e.g., a printed circuit board (PCB) or module component of a device).

Other examples of the apparatus 102 include a wearable device, such as a smartwatch or intelligent glasses: an entertainment device, such as a set-top box or streaming dongle, a smart television, a gaming device, or virtual reality (VR) goggles: a motherboard or blade of a server: a consumer appliance: a vehicle or drone, or the electronic components thereof: industrial equipment, or the electronic components thereof: a security or other sensor device: and so forth. Each type of electronic device or other apparatus can include one or more components to provide some computing functionality or feature that is enabled or enhanced by the hardware or techniques that are described herein.

In example implementations, the apparatus 102 can include at least one host device 104, at least one interconnect 106, and at least one memory device 108. The host device 104 can include at least one processor 114, at least one cache memory 116, and at least one memory controller 118. The memory device 108 can include at least one memory die 110, such as a first memory die 110-1 and a second memory die 110-2. Each memory die 110 may include at least one memory or memory array (not explicitly shown in FIG. 1). The memory device 108 or the memory thereof may be realized with one or more memory types.

The memory of the memory device 108 may be realized, for example, with a dynamic random-access memory (DRAM) die or module, including with a three-dimensional (3D) stacked DRAM device, such as a high bandwidth memory (HBM) device or a hybrid memory cube (HMC) device. DRAM may include, for instance, synchronous DRAM (SDRAM) or double data rate (DDR) DRAM (DDR DRAM). The memory of the memory device 108 may also be realized using static random-access memory (SRAM). Thus, the memory device 108 may operate as a main memory or a cache memory, including as both. Additionally or alternatively, the memory device 108 may operate as storage memory. In such cases, the memory may be realized, for example, with a storage-class memory type, such as one employing 3D XPoint™ or phase-change memory (PCM), flash memory, a magnetic hard disk, a solid-state drive (e.g., a Non-Volatile Memory Express® (NVMe®) device), or a combination thereof.

Regarding the host device 104, the processor 114 can be coupled to the cache memory 116, and the cache memory 116 can be coupled to the memory controller 118. The processor 114 can be coupled to the memory controller 118 directly (e.g., without going through a cache memory) or indirectly (e.g., via the cache memory 116 as depicted). The host device 104 may include other components to form, for instance, a system-on-a-chip or a system-on-chip (SoC). The processor 114 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communication processor (e.g., a modem or baseband processor), an SoC, and so forth.

In operation, the memory controller 118 (e.g., or controller generally) can provide a high-level or logical interface between the processor 114 and at least one memory device, such as a memory that is external to the host device 104. The memory controller 118 can, for example, receive memory requests from the processor 114 and provide the memory requests to an external memory (e.g., a memory device 108) with appropriate formatting, packaging, timing, reordering, and so forth. The memory controller 118 can forward to the processor 114 responses to the memory requests that the memory controller 118 receives from the external memory.

The memory controller 118 may communicate with multiple memory devices, or other types of devices, some of which may include one or more memory components. The memory controller 118 may communicate with multiple memory or other devices over one or more interconnects, such as the interconnect 106. Regarding connections that are external to the host device 104, the host device 104 can be coupled to the memory device 108 via the interconnect 106. The memory device 108 may be coupled to, or may include, a main memory or a storage memory, including both in some cases. Another device, such as a cache memory or a switch, may be coupled between the host device 104 and the memory device 108 and may be part of or separate from the interconnect 106.

The depicted interconnect 106, as well as other interconnects (not shown) that communicatively couple together various components, enables data to be transferred between two or more components of the various components. Interconnect examples include a bus, a switching fabric, a crossbar, one or more wires that carry voltage or current signals, and so forth. Each interconnect 106 may be implemented as a unidirectional interconnect or a bidirectional interconnect. The command bus 120 can be "directly" coupled to each memory die 110 or to fewer than all the memory dies of the memory device 108. Similarly, the data bus 122 can be "directly" coupled to each memory die 110 or to fewer than all the memory dies of the memory device 108. If a memory die 110 is not "directly" coupled to a given bus, then the memory die 110 may be "indirectly" coupled to that bus via at least one other memory die 110.

The interconnect 106 can be implemented as a parallel propagation pathway. For example, the interconnect 106 can include at least one command bus 120 (or command and address bus 120) and at least one data bus 122, each of which carries multiple bits of a particular item of information (e.g., a data byte) substantially simultaneously. As used herein, the multiple bits can be transmitted substantially simultaneously if, for example, the bits are communicated within a given clock period or half period, even if the individual bits are intentionally or inadvertently staggered slightly within the clock period or half period. Alternatively, the interconnect 106 can be implemented as a serial propagation pathway that carries one bit of a particular item of information each clock cycle. For instance, the interconnect 106 can comport with a PCIe standard, such as version 4, 5, 6, or a future version. The interconnect 106 may include multiple serial propagation pathways, such as multiple lanes in a PCIe implementation, such that multiple items of information are being propagated at some times.

The components of the apparatus 102 that are depicted in FIG. 1 represent an example computing architecture that may include a hierarchical memory system. A hierarchical memory system can include memories at different levels, with each level having a memory with a different speed, capacity, or volatile/nonvolatile characteristic. Thus, the memory device 108 may be described in terms of forming at least part of a main memory of the apparatus 102. The memory device 108 may, however, form at least part of a cache memory, a storage memory, an SoC, and so forth of an apparatus 102.

Although various implementations of the apparatus 102 are depicted in FIG. 1 and described herein, an apparatus 102 can be implemented in alternative manners. For example, the host device 104 may include multiple cache memories, including multiple levels of cache memory, or may omit a cache memory. A memory, such as the memory device 108, may have a respective "internal" or "local" cache memory (not shown). In some cases, the host device 104 may omit the processor 114 and/or include other logic. Generally, the illustrated and described components may be implemented in alternative ways, including in distributed or shared memory systems. A given apparatus 102 may also include more, fewer, or different components than those depicted in FIG. 1 or described herein.

The host device 104 and any of the various memories may be realized in multiple manners. In some cases, the host device 104 and the memory device 108 may be located on separate blades or racks, such as in a server or data center computing environment. In other cases, the host device 104 and the memory device 108 can both be disposed on, or physically supported by or mounted on, a same printed circuit board (PCB) (e.g., a rigid or flexible motherboard or PCB assembly). The host device 104 and the memory device 108 may also be integrated on a same IC or fabricated on separate ICs but packaged together.

A memory device 108 may also be coupled to multiple host devices 104 via one or more interconnects 106 and may be able to respond to memory requests from two or more of the multiple host devices 104. Each host device 104 may include a respective memory controller 118, or the multiple host devices 104 may share a common memory controller 118. An example computing system architecture with at least one host device 104 that is coupled to a memory device 108 is described below with reference to FIG. 2.

With continuing reference to FIG. 1, however, the memory controller 118 or the memory device 108 can perform one or more techniques for controller-level memory repair. For example, the memory controller 118 can communicate with the memory device 108 as described herein. In some implementations, to support the controller-level memory repair, the memory controller 118 includes memory repair logic 124 (or "MR logic 124" or "MRL 124"), and the memory device 108 includes memory repair logic 112 (or "MR logic 112" or "MRL 112"). Each respective memory die 110 can include a respective instance of memory repair logic 112. As shown, the first memory die 110-1 includes first memory repair logic 112-1, and the second memory die 110-2 includes second memory repair logic 112. Nonetheless, the memory repair logic 112 of the memory device 108 may be distributed differently and/or may have a different quantity of instances of the logic.

In an example initialization procedure for controller-level memory repair, the memory repair logic 124 transmits a request 126 over a bus, such as the command bus 120, of the interconnect 106 to the memory device 108. Each memory die 110 responds with repair information 128. The repair information 128 can include, for instance, at least one faulty address and redundancy data, which is described with reference to FIG. 3. The memory repair logic 124 of the memory controller 118 can generate a data structure that provides repair solutions using the repair information 128. Examples of such a data structure are described with reference to FIGS. 3 and 9. Use of the data structure to provide controller-level memory repair by sharing redundant memory portions is described with reference to FIGS. 3 to 8.

Figure 4:
FIG. 4 illustrates examples of a system that can include a host device and a memory device coupled together via an interconnect and that can implement aspects of controller-level memory repair.

Other example environments for controller-level memory repair are shown in FIG. 4. In some implementations, as depicted in FIG. 1, the memory controller 118 is realized as a memory controller that interfaces with the interconnect 106 using, for instance, an SDRAM protocol or standard, such as a DDR Version 5 standard. In other implementations, the apparatus 102 operates with one or more protocols over the interconnect 106. The apparatus 102 can operate, for example, a Compute Express Link™ (CXL) protocol across the interconnect 106. In at least some of these cases, the apparatus 102 can overlay the CXL protocol on top of a PCIe protocol for the physical layer. Thus, in such implementations, the host device 104 can include a controller that comports with a CXL standard or a PCIe standard, including comporting with both. Similarly, a controller 422 (e.g., as shown in 4) at the memory device 108 can comport with a CXL standard or a PCIe standard, including with both. Examples of devices that comport with a CXL standard are described below with reference to FIG. 4. As shown with respect to FIG. 4, a CXL memory device may include a memory controller 408 (like the memory controller 118) that includes memory repair logic 124 and a memory that includes memory repair logic 112. Still other example environments in which controller-level memory repair may be implemented include Computational Storage Devices (CSxes). Computational Storage Processors (CSPs). Computational Storage Drives (CSDs), and Computational Storage Arrays (CSAs). Additional circuitry, techniques, and mechanisms are also described below. Next, however, this document describes example computing architectures with one or more processors and a memory device.

Figure 2:
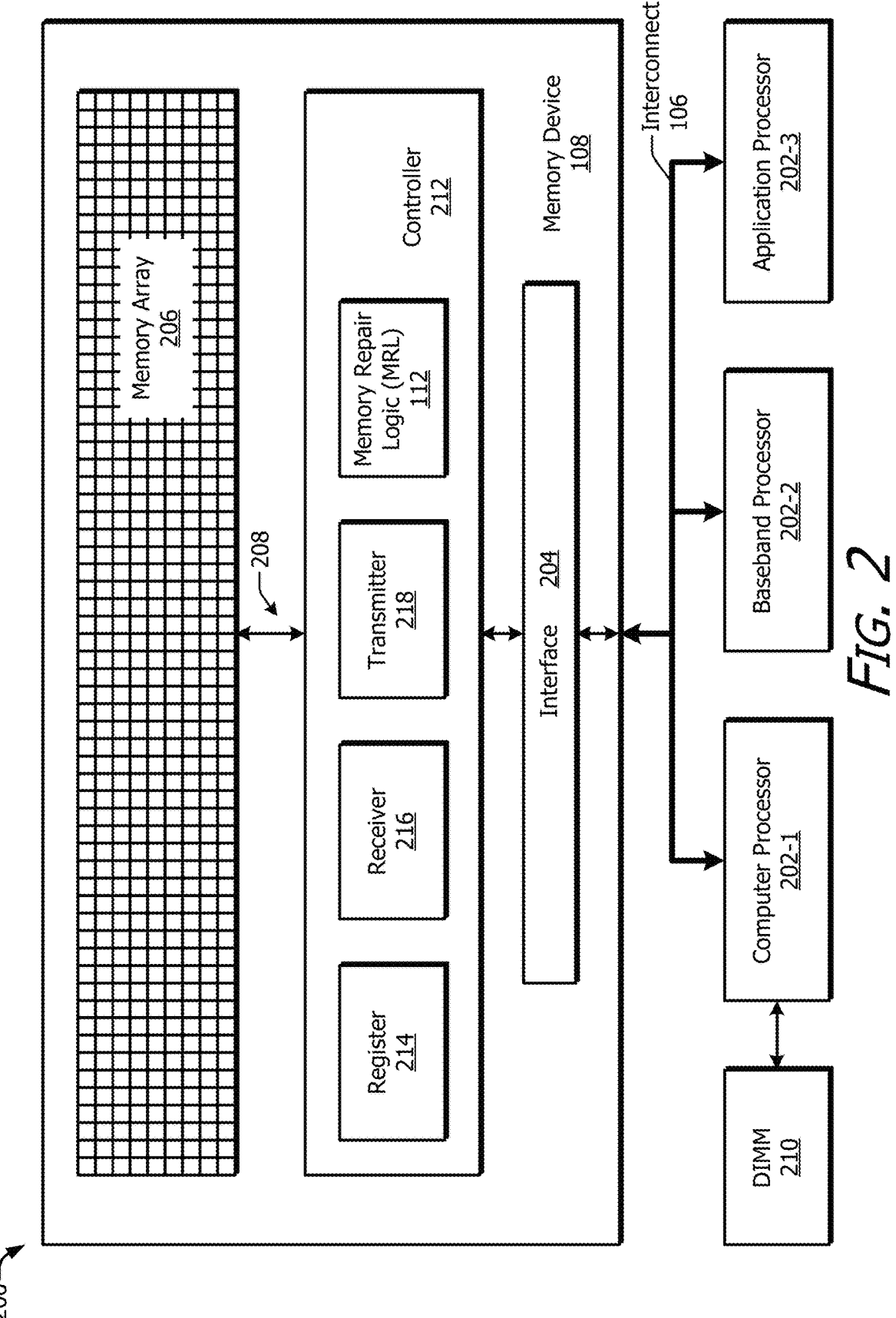
FIG. 2 illustrates example computing systems that can implement aspects of controller-level memory repair with regard to an example memory device.

FIG. 2 illustrates examples of a computing system 200 that can implement aspects of controller-level memory repair with regard to an example memory device 108. In some implementations, the computing system 200 includes at least one memory device 108, at least one interconnect 106, and at least one processor 202. The memory device 108 can include, or otherwise be associated with, at least one memory array 206, at least one controller 212, and at least one interface 204. The at least one controller 212 can be communicatively coupled to the memory array 206 via at least one interconnect 208 (e.g., an "internal" interconnect). The memory array 206 and the controller 212 may be components that are integrated on a single semiconductor die or that are located on separate semiconductor dies (e.g., but that are still coupled to or disposed on a same PCB). Each of the memory array 206 or the controller 212 may also be distributed across multiple dies (or dice).

The memory device 108 can correspond, for example, to one or more of a cache memory, main memory, or storage memory of the apparatus 102 of FIG. 1. Thus, the memory array 206 can include an array of memory cells. These memory cells can include, but are not limited to, memory cells of Static Random-Access Memory (SRAM). Dynamic Random-Access Memory (DRAM). Synchronous DRAM (SDRAM), three-dimensional (3D) stacked DRAM. Double Data Rate (DDR) memory, low-power Dynamic Random-Access Memory (DRAM). Low-Power Double Data Rate (LPDDR) Synchronous Dynamic Random-Access Memory (SDRAM), phase-change memory (PCM), or flash memory.

The controller 212 can include any one or more of a number of components that can be used by the memory device 108 to perform various operations. These operations can include communicating with other devices, managing performance, modulating memory access rates, refreshing the memory array, training to use a bus, participating in a memory repair operation, and performing memory read or write operations. For example, the controller 212 can include at least one register 214, at least one receiver 216, at least one transmitter 218, and at least one instance of memory repair logic 112 (MRL 112).

The register 214 may be implemented, for example, as one or more registers that can store information to be used by the controller 212, by another part of the memory device 108, or by a part of a host device 104, such as a memory controller 118 as depicted in FIG. 1. A register 214 may store, for instance, a mode value indicative of if a repair mode has been entered, a state of at least one redundant memory portion, a faulty address, and so forth. The controller 212 may include more, fewer, different, and/or alternative components. Although depicted separately, the components of the controller 212 may be nested with respect to each other, may provide functionality or circuitry that is at least partially overlapping with another component, and so forth. In some cases, the receiver 216 or the transmitter 218, including one or more instances of both, may be incorporated as part of the interface 204.

The interface 204 can couple the controller 212 or the memory array 206 directly or indirectly to the interconnect 106. The receiver 216 can receive information via the interconnect 106, such as from a processor 202. The transmitter 218 can transmit information onto the interconnect 106. As shown in FIG. 2, the register 214, the receiver 216, the transmitter 218, and the memory repair logic 112 can be part of a single component (e.g., the controller 212). In other implementations, one or more of the register 214, the receiver 216, the transmitter 218, or the memory repair logic 112 may be implemented as separate components, which can be provided on a single semiconductor die or disposed across multiple semiconductor dies. These components of the controller 212 may be individually or jointly coupled to the interconnect 106 via the interface 204.

The interconnect 106 may be implemented with any one or more of a variety of interconnects that communicatively couple together various components and enable commands, addresses, messages, packets, data, and/or other information to be transferred between two or more of the various components (e.g., between the memory device 108 and any of the one or more processors 202 or a memory controller or other controller that is separate from a processor 202). The information may be propagated over the interconnect 106 in a "raw" manner or using some form of encapsulation or packaging, such as with packets, frames, or flits. Although the interconnect 106 is represented with a single line or arrow in FIG. 2, the interconnect 106 may include at least one bus, at least one switching fabric, at least one crossbar, one or more wires or traces that carry voltage or current signals, at least one switch, one or more buffers, at least one lane, and so forth. Accordingly, the interconnect 106 may contain two or more of any of these, such as three buses or a bus and a switching fabric.

In some aspects, the memory device 108 may be realized as a "separate" physical component relative to the host device 104 (of FIG. 1) or any of the processors 202. Examples of physical components that may be separate include, but are not limited to, a printed circuit board (PCB), which can be rigid or flexible: a memory card: a memory stick: and a memory module, including a single in-line memory module (SIMM), a dual in-line memory module (DIMM), or a non-volatile memory express (NVMe) module. Thus, separate physical components may be located together within a same housing of an electronic device or a memory product, or such physical components may be distributed over a server rack, a data center, and so forth. Alternatively, the memory device 108 may be packaged or integrated with other physical components, including a host device 104 or a processor 202, such as by being disposed on a common PCB, combined together in a single device package, or integrated into an SoC of an apparatus.

As shown in FIG. 2, the one or more processors 202 may include a computer processor 202-1, a baseband processor 202-2, and an application processor 202-3, which are coupled to the memory device 108 through the interconnect 106. The processors 202 may each be, or may form a part of, a CPU, a GPU, an SoC, an ASIC, an FPGA, or the like. In some cases, a single "processor" can comprise multiple processing cores or resources, each dedicated to different functions, such as modem management, applications, graphics, central processing, neural network acceleration, or the like. In some implementations, the baseband processor 202-2 may include or be coupled to a modem (not shown in FIG. 2) and may be referred to as a modem processor. The modem and/or the baseband processor 202-2 may be coupled wirelessly to a network via, for example, cellular. Wi-FiR, Bluetooth®, ultra-wideband (UWB), near field, or another technology or protocol for wireless communication.

In various implementations, the processors 202 may be connected to different memories in different manners. For example, the processors 202 may be connected directly to the memory device 108 (e.g., via the interconnect 106 as shown). Alternatively, one or more of the processors 202 may be indirectly connected to the memory device 108, such as over a network connection, through one or more other devices or components, and/or using at least one other additional interconnect. Each processor 202 may be realized similarly to the processor 114 of FIG. 1. Accordingly, a respective processor 202 can include or be associated with a respective controller, like the memory controller 118 depicted in FIG. 1. Alternatively, two or more processors 202 may access the memory device 108 using a shared or system controller, including a shared memory controller 118. In any of such cases, the memory controller 118 may include memory repair logic 124 (e.g., of FIG. 1).

Each processor 202 may also be separately connected to a respective memory. As shown, the computer processor 202-1 may be coupled to at least one DIMM 210 that is inserted into a DIMM slot of a motherboard. The DIMM 210 can be coupled to a memory controller (not shown), which may be part of the computer processor 202-1. The DIMM 210 may be realized with a memory device 108 and/or include any of the components shown in FIG. 2 (or the other figures) for a memory device 108 (or other described memory device).

The apparatuses and methods that are described herein may be appropriate for memory that is designed for use with an SDRAM-compatible bus, a DDR-memory-related bus, a PCIe bus, and so forth. Thus, the described principles may be incorporated into a memory device with a PCIe interface. Further, the memory device can communicate over the interconnect 106 by overlaying a CXL protocol on the physical PCIe interface. An example of a memory standard that relates to CXL is promulgated by the Compute Express Link™ consortium and may include versions 1.0, 1.1, 2.0, and future versions. Thus, the host device 104 (e.g., of FIG. 1) or the memory device 108, including both in some cases, may comport with at least one CXL standard. Accordingly, some terminology in this document may draw from one or more of these standards or versions thereof for clarity. The described principles, however, are also applicable to memories that comport with other standards, including earlier versions or future versions of such standards, and to memories that do not adhere to a public standard. Examples of systems that may include a PCIe interface and a CXL protocol overlay are described below with reference to FIG. 4.

Figure 3:
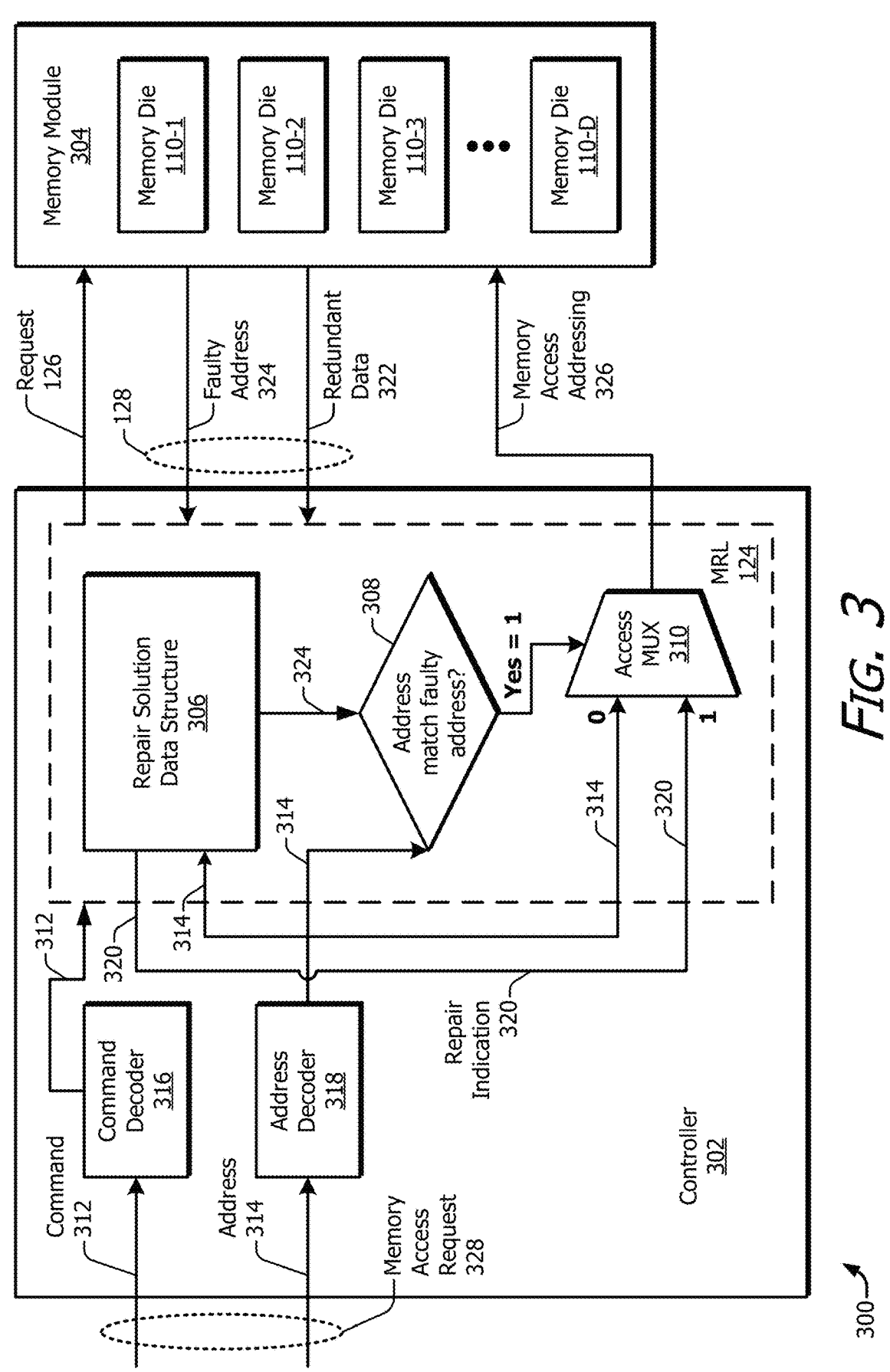
FIG. 3 illustrates examples of a controller that can implement aspects of controller-level memory repair.

FIG. 3 illustrates, at 300 generally, examples of a controller 302 that can implement aspects of controller-level memory repair. As shown, the controller 302 is coupled to a memory module 304. The memory module 304 includes multiple memory dies 110-1 . . . 110-D, with "D" representing a positive integer. Specifically, a first memory die 110-1, a second memory die 110-2, a third memory die 110-3, . . . , a "Dth" memory die 110-D can be part of the memory module 304. Thus, the controller 302 can be coupled to at least one memory die 110.

In example implementations, the controller 302 includes at least one command decoder 316, at least one address decoder 318, and at least one instance of memory repair logic 124. The controller 302 can be implemented as, for example, a memory controller, such as a memory controller 118 as shown in FIG. 1. Alternatively, the controller 302 can be implemented as a memory controller 408 (e.g., as described below with reference to FIG. 4). The memory repair logic 124 is coupled to the command decoder 316 and the address decoder 318.

The command decoder 316 and the address decoder 318 receive a memory access request 328 from a component (not shown in FIG. 3) that is upstream of the controller 302. The upstream component can correspond to the processor 114 (of FIG. 1), a link controller 414 (e.g., as described below with reference to FIG. 4), and so forth. The memory access request 328 includes a command 312, such as command to access the memory module 304, and an address 314 indicating where the memory is to be accessed. The memory repair logic 124 can accept or receive the command 312 and the address 314 from the command decoder 316 and the address decoder 318, respectively.

In example operations for part of an initialization procedure, the memory repair logic 124 of the controller 302 transmits to the memory module 304 a request 126 for repair information 128. The memory repair logic 124 can transmit the request 126 to each memory die 110 of the multiple memory dies 110-1 . . . 110-D. Thus, each memory die 110 receives the request 126. In response, each memory die 110 transmits the repair information 128 associated with the respective memory die 110 to the controller 302, and the memory repair logic 124 receives the repair information 128.

In some cases, the repair information 128 includes at least one faulty address 324 and redundancy data 322. The faulty address 324 can be included, for instance, if a given memory die 110 has a faulty memory location that the given memory die 110 cannot repair using a redundant memory portion that is associated with (e.g., that is internal to) the given memory die 110. The redundancy data 322 may include an indication that no redundant memory portions remain available. Alternatively, the redundancy data 322 may include a quantity of remaining available redundant memory portions, an identifier of the one or more available redundant memory portions, an indication of a type of redundant memory portion (e.g., row, column, size, or addressability options), an indication of how a redundant memory portion is addressable, and so forth.

The memory repair logic 124 processes the faulty address 324 and the redundancy data 322 received from each memory die 110 to generate a repair solution data structure 306. This repair information 128 from the multiple memory dies 110-1 . . . 110-D thus informs the memory repair logic 124 which one or more memory dies have at least one unrepaired faulty memory cell and which other one or more memory dies have at least one redundant memory portion that is available for sharing to repair the unrepaired faulty memory cells. Based on the repair information 128, the repair solution data structure 306 includes multiple entries with each entry mapping a faulty address 324 to a repair indication 320.

The repair indication 320 can include a substitute or repair address of a redundant memory portion of a different memory die 110 and instructions for accessing the redundant memory portion. These instructions may include a signal, a command, a mode, or some combination thereof that enables the controller 302 to access the redundant memory portion as mapped to the faulty address 324. Thus, the memory repair logic 124 can use the repair solution data structure 306 to remap a memory access request 328 and produce a remapped memory access request (not shown in FIG. 3).

In example operations, the memory repair logic 124 compares each faulty address 324 stored in an entry of the repair solution data structure 306 to the address 314 of the received memory access request 328. At a decision 308, the memory repair logic 124 determines if the address 314 corresponds to (e.g., at least partially matches) the faulty address 324 of any entry of the repair solution data structure 306. If there is a match, then the memory repair logic 124 applies an affirmative "1" to the access multiplexer 310 (access MUX 310) to select the repair indication 320 for accessing the memory module 304.

The memory repair logic 124 uses the selected input of the access multiplexer 310 to determine memory access addressing 326 for the remapped memory access request. If, on the other hand, the address 314 does not match the faulty address 324 of any entry in the repair solution data structure 306, the "0" input of the access multiplexer 310 is selected. Accordingly, the controller 302 can access the memory module 304 using the address 314 from the memory access request 328 without referring to an inter-die repair indication 320.

FIG. 4 illustrates examples of a system 400 that can include a host device 104 and a memory device 108 coupled together via an interconnect 106 and that can implement aspects of controller-level memory repair. The system 400 can implement aspects of controller-level memory repair and may form at least part of an apparatus 102 as shown in FIG. 1. As illustrated in FIG. 4, the host device 104 includes a processor 114 and a controller 420, which can be realized with at least one initiator 402. Thus, the initiator 402 can be coupled to the processor 114 or to the interconnect 106 (including to both), and the initiator 402 can be coupled between the processor 114 and the interconnect 106. Examples of initiators 402 may include a leader, a primary, a master, a requester or requesting component, a main component, and so forth.

In the illustrated example system 400, the memory device 108 includes a controller 422, which can be realized with at least one target 404. The target 404 can be coupled to the interconnect 106. Thus, the target 404 and the initiator 402 can be coupled to each other via the interconnect 106. Examples of targets 404 may include a follower, a secondary, a slave, a subordinate, a responder or responding component, a subsidiary component, and so forth. The memory device 108 also includes a memory 424. The memory 424 can be realized with at least one memory module, chip, or die having at least one memory array 206 (of FIG. 2) or another component, such as a DRAM 410 as is described below.

In example implementations, the initiator 402 includes at least one link controller 412, and the target 404 includes at least one link controller 414. The link controller 412 or the link controller 414 can instigate, coordinate, cause, or otherwise participate in or control signaling across a physical or logical link realized by the interconnect 106 in accordance with one or more protocols. The link controller 412 may be coupled to the interconnect 106. The link controller 414 may also be coupled to the interconnect 106. Thus, the link controller 412 can be coupled to the link controller 414 via the interconnect 106. Each link controller 412 or 414 may, for instance, control communications over the interconnect 106 at a link layer or at one or more other layers of a given protocol. Communication signaling may include, for example, a request 416, a response 418, and so forth.

The memory device 108 may further include at least one interconnect 406 and at least one memory controller 408 (MC 408). Within the memory device 108, and relative to the target 404, the interconnect 406, the memory controller 408, and/or the DRAM 410 (or other component of the memory 424) may be referred to as a "backend" or "downstream" component or memory component of the memory device 108. In some cases, the interconnect 406 is internal to the memory device 108 and may operate the same as or differently from the interconnect 106 or operate like the interconnect 208 (of FIG. 2).

Thus, the memory device 108 can include at least one memory component. As shown, the memory device 108 may include multiple memory controllers 408-1 and 408-2 and/or multiple DRAMs 410-1 and 410-2. Although two of each are shown, the memory device 108 may include one or more than two memory controllers and/or one or more than two DRAMs. For example, a memory device 108 may include four memory controllers and 16 DRAMs, such as four DRAMs per memory controller. The memory 424 or memory components of the memory device 108 are depicted as DRAM 410 as an example only, for one or more of the memory components may be implemented as another type of memory. For instance, the memory components may include nonvolatile memory like flash or PCM. Alternatively, the memory components may include other types of volatile memory like SRAM. Thus, the memory device 108 may include a dynamic random-access memory (DRAM) array, a static random-access memory (SRAM) array, or a nonvolatile memory array. A memory device 108 may also include any combination of memory types.

In some cases, the memory device 108 may include the target 404, the interconnect 406, the at least one memory controller 408, and the at least one DRAM 410 within a single housing or other enclosure. The enclosure, however, may be omitted or may be merged with one for the host device 104, the system 400, or an apparatus 102 (of FIG. 1). In some cases, each of these components can be realized with a separate IC. In some of such cases, the interconnect 406 can be disposed on a PCB. Each of the target 404, the memory controller 408, and the DRAM 410 may be fabricated on at least one IC and packaged together or separately. The packaged IC(s) may be secured to or otherwise supported by the PCB (or PCB assembly) and may be directly or indirectly coupled to the interconnect 406. In other cases, the target 404 of the controller 422, the interconnect 406, and/or the one or more memory controllers 408 may be integrated together into one IC. In some of such cases, this IC may be coupled to a PCB, and one or more modules for the components of the memory 424 may also be coupled to the same PCB, which can form a CXL memory device 108. This memory device 108 may be enclosed within a housing or may include such a housing. The components of the memory device 108 may, however, be fabricated, packaged, combined, and/or housed in other manners.

As illustrated in FIG. 4, the target 404, including the link controller 414 thereof, can be coupled to the interconnect 406. Each memory controller 408 of the multiple memory controllers 408-1 and 408-2 can also be coupled to the interconnect 406. Accordingly, the target 404 and each memory controller 408 of the multiple memory controllers 408-1 and 408-2 can communicate with each other via the interconnect 406. Each memory controller 408 is coupled to at least one DRAM 410. As shown, each respective memory controller 408 of the multiple memory controllers 408-1 and 408-2 is coupled to at least one respective DRAM 410 of the multiple DRAMs 410-1 and 410-2. Each memory controller 408 of the multiple memory controllers 408-1 and 408-2 may, however, be coupled to a respective set of multiple DRAMs or other memory components. Although not explicitly depicted in FIG. 4, a memory controller 408 may include or may be coupled to a physical-layer (PHY) chip or circuitry that supports, for instance, analog-signaling aspects of communications with the DRAM 410.

Each memory controller 408 can access at least one DRAM 410 by implementing one or more memory access protocols to facilitate reading or writing data based on at least one memory address. The memory controller 408 can increase bandwidth or reduce latency for the memory accessing based on a type of the memory or an organization of the memory components, such as the multiple DRAMs. The multiple memory controllers 408-1 and 408-2 and the multiple DRAMs 410-1 and 410-2 can be organized in many different manners. For example, each memory controller 408 can realize one or more memory channels for accessing the DRAMs. Further, the DRAMs can be manufactured to include one or more ranks, such as a single-rank or a dual-rank memory module. Each DRAM 410 (e.g., at least one DRAM IC chip) may also include multiple banks, such as 8 or 16 banks.

A forward (or downstream) path of the memory device 108 may include one or more memory request queues (not shown). A return (or upstream) path of the memory device 108 may include one or more memory response queues (not shown). These queues may be present in, for example, the controller 422, a memory controller 408, a memory array, such as the DRAM 410, and so forth. Examples of a forward path and a return path are described next as part of an accessing operation for the memory device 108.

This document now describes examples of the host device 104 accessing the memory device 108. The examples are described in terms of a general memory access (e.g., a memory request) which may include a memory read access (e.g., a memory read request for a data retrieval operation) or a memory write access (e.g., a memory write request for a data storage operation). The processor 114 can provide a memory access request 452 to the initiator 402. The memory access request 452 may be propagated over a bus or other interconnect that is internal to the host device 104. This memory access request 452 may be or may include a read request or a write request. The initiator 402, such as the link controller 412 thereof, can reformulate the memory access request 452 into a format that is suitable for the interconnect 106. This reformulation may be performed based on a physical protocol or a logical protocol (including both) applicable to the interconnect 106. Examples of such protocols are described below.

The initiator 402 can thus prepare a request 416 and transmit the request 416 over the interconnect 106 to the target 404. The target 404 receives the request 416 from the initiator 402 via the interconnect 106. The target 404, including the link controller 414 thereof, can process the request 416 to determine (e.g., extract, decode, or interpret) the memory access request. Based on the determined memory access request, and as part of the forward path of the memory device 108, the target 404 can forward a memory request 454 over the interconnect 406 to a memory controller 408, which is the first memory controller 408-1 in this example. For other memory accesses, the targeted data may be accessed with the second DRAM 410-2 through the second memory controller 408-2. Thus, the first memory controller 408-1 receives the memory request 454 via the internal interconnect 406.

The first memory controller 408-1 can prepare a memory command 456 based on the memory request 454. The first memory controller 408-1 can provide the memory command 456 to the first DRAM 410-1 over an interface or interconnect appropriate for the type of DRAM or other memory component. The transmission of the memory command 456 may be supported by a PHY chip or PHY circuitry (not separately shown). An applicable memory standard includes, by way of example only, LPDDR5 for SDRAM. The first DRAM 410-1 receives the memory command 456 from the first memory controller 408-1 and can perform the corresponding memory operation. Based on the results of the memory operation, the first DRAM 410-1 can generate a memory response 462. If the memory request 416 is for a read operation, the memory response 462 can include the requested data. If the memory request 416 is for a write operation, the memory response 462 can include an acknowledgment that the write operation was performed successfully. As part of the return path of the memory device 108, the first DRAM 410-1 can provide the memory response 462 to the first memory controller 408-1.

Continuing the return path of the memory device 108, the first memory controller 408-1 receives the memory response 462 from the first DRAM 410-1. The reception of the memory response 462 from the DRAM 410-1 may be supported by a PHY chip or PHY circuitry. Based on the memory response 462, the first memory controller 408-1 can prepare a memory response 464 and transmit the memory response 464 to the target 404 via the interconnect 406. The target 404 receives the memory response 464 from the first memory controller 408-1 via the interconnect 406. Based on this memory response 464, and responsive to the corresponding memory request 416, the target 404 can formulate a response 418 for the requested memory operation. The memory response 418 can include read data or a write acknowledgement and be formulated in accordance with one or more protocols of the interconnect 106.

To respond to the memory request 416 from the host device 104, the target 404 of the memory device 108 can transmit the memory response 418 to the initiator 402 over the interconnect 106. Thus, the initiator 402 receives the response 418 from the target 404 via the interconnect 106. The initiator 402 can therefore respond to the "originating" memory access request 452, which is from the processor 114 in this example. To do so, the initiator 402 prepares a memory access response 466 using the information from the response 418 and provides the memory access response 466 to the processor 114. In these manners, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 402 and the target 404. Generally, the interconnect 106 can carry memory-related information, such as data or a memory address, between the initiator 402 and the target 404. In some cases, the initiator 402 or the target 404 (including both) can prepare memory-related information for communication across the interconnect 106 by encapsulating such information. The memory-related information can be encapsulated or incorporated into, for example, at least one packet (e.g., at least one flit). One or more packets may include at least one header with information indicating or describing the content of each packet.

In example implementations, the interconnect 106 can support, enforce, or enable memory coherency for a shared memory system, for a cache memory, for combinations thereof, and so forth. Thus, the memory device 108 can operate in a cache coherent memory domain in some cases. Additionally or alternatively, the interconnect 106 can be operated based on a credit allocation system. Thus, the initiator 402 and the target 404 can communicate using, for example, a credit-based flow control mechanism. Possession of a credit can enable an entity, such as the initiator 402, to transmit another memory request 416 to the target 404. The target 404 may return credits to "refill" a credit balance in the initiator 402. Credit logic of the target 404 or credit logic of the initiator 402 (including both instances of credit logic working together in tandem) can implement a credit-based communication scheme across the interconnect 106.

The system 400, the initiator 402 of the host device 104, or the target 404 of the memory device 108 may operate or interface with the interconnect 106 in accordance with one or more physical or logical protocols. For example, the interconnect 106 may be built in accordance with a Peripheral Component Interconnect Express® (PCIe or PCI-E) standard. Applicable versions of the PCIe standard may include 1.x. 2.x, 3.x, 4.0, 5.0, 6.0, and future or alternative versions of the standard.

In some cases, at least one other standard is layered over the physical-oriented PCIe standard. For example, the initiator 402 or the target 404 can communicate over the interconnect 106 in accordance with a Compute Express Link™ (CXL) standard. Applicable versions of the CXL standard may include 1.x, 2.0, and future or alternative versions of the standard. Thus, the initiator 402 and/or the target 404 may operate so as to comport with a PCIe standard or PCIe protocol and/or a CXL standard or CXL protocol. A device or component may comprise or operate in accordance with a CXL Type 1, Type 2, or Type 3 device. A CXL standard may operate based on credits, such as request credits, response credits, and data credits.

In some implementations, controller-level memory repair can be employed in a CXL or analogous environment. For example, one or more components of DRAM 410, such as at least one chip or die thereof, can include an instance of memory repair logic 112. As shown, the first DRAM 410-1 includes first MR logic 112-1, and the second DRAM 410-2 includes second MR logic 112-2. A memory controller 408 may include an instance of memory repair logic 124 (MRL 124) to interact with the MR logic 112 as part of implementing controller-level memory repair. As shown, the first memory controller 408-1 includes first MR logic 124-1, and the second memory controller 408-2 includes second MR logic 124-2. In some of such cases, the controller 422 may include logic that operates to provide a front-end (e.g., front-end logic) for the memory controllers 408-1 and 408-2 with respect to CXL-related signaling. Example aspects of controller-level memory repair with respect to at least one memory controller and one or more memory dies are described next, starting with FIG. 5.

Example Techniques and Hardware

Figure 5:
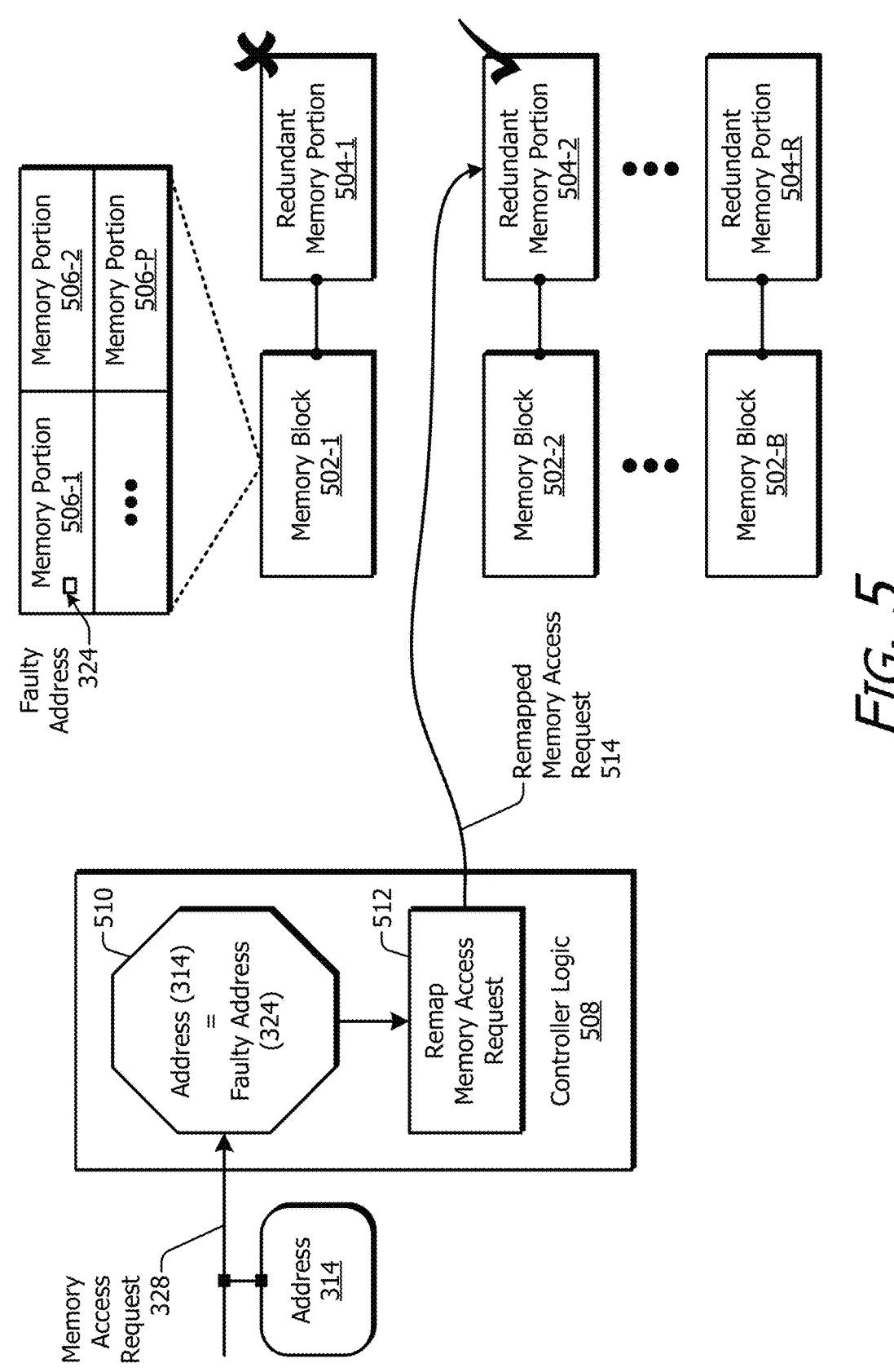
FIG. 5 illustrates example schemes for controller-level memory repair, which schemes can involve memory repair logic of a controller in communication with multiple memory blocks that include multiple memory portions.

FIG. 5 illustrates example schemes 500 for controller-level memory repair with example memory hardware depicted. The schemes 500 can involve controller logic 508 (e.g., a controller that includes memory repair logic, such as the memory controller 118 (of FIG. 1), the controller 302 (of FIG. 3), the controllers 420 and 422 (of FIG. 4), or a memory controller 408 (of FIG. 4)). The controller logic 508 is in communication with multiple memory blocks 502-1 . . . 502-B, with "B" representing a positive integer. As shown, there is a first memory block 502-1, a second memory block 502-2, . . . , a "Bth" memory block 502-B. Each memory block 502 includes multiple memory portions 506-1 . . . 506-P, with "P" representing a positive integer. For clarity, only the memory portions 506-1 . . . 506-P of the first memory block 502-1 are illustrated in FIG. 5. As shown, there is a first memory portion 506-1, a second memory portion 506-2, . . . , a "Pth" memory portion 506-P. Each memory block 502 may, however, include a different quantity of memory portions as compared to one or more other memory blocks.

In example implementations, each respective memory block 502 includes or is otherwise associated with at least one respective redundant memory portion 504. For example, a redundant memory portion 504 may be included in the associated memory block 502, may be operatively coupled to the associated memory block 502, may be designated to provide spare memory for the associated memory block 502 without going off-chip or needing an external controller to dynamically remap each memory access request, some combination thereof, and so forth. In FIG. 5, there are "R" redundant memory portions, with "R" representing a positive integer: a first redundant memory portion 504-1, a second redundant memory portion 504-2, . . . , an "Rth" redundant memory portion 504-R.

As shown, the first memory block 502-1 is associated with the first redundant memory portion 504-1, the second memory block 502-2 is associated with the second redundant memory portion 504-2, . . . , the "Bth" memory block 502-B is associated with the "Rth" redundant memory portion 504-R. Each of the integers "B," "P," and "R" may have the same or different values with respect to each other. By way of example only, in an eight memory-block system (B=8), if each memory block 502 is associated with four redundant memory portions, then the system has 32 total redundant memory portions 504-1 . . . 504-R, with "R=32." In the figures, a redundant memory portion 504 with an "X" icon is already in-use or is otherwise unavailable for sharing. In contrast, a redundant memory portion 504 with a "check mark" icon is available for sharing with another memory block 502. Thus, the first redundant memory portion 504-1 is not available for sharing, but the second redundant memory portion 504-2 is available for sharing.

In the illustrated example, the first memory portion 506-1 of the first memory block 502-1 includes a memory location that has failed and cannot be repaired by a redundant memory portion 504 of the first memory block 502-1. This memory failure is indicated by a faulty address 324 that identifies the faulty memory location. The controller logic 508 receives a memory access request 328 that includes or otherwise targets an address 314. Here, the controller logic 508 determines at 510 that the address 314 of the memory access request 328 corresponds to the faulty address 324 of the first memory portion 506-1 of the first memory block 502-1. The determined correspondence can be based on the two addresses at least partially matching, can be based on the address 314 at least partially overlapping at least one failed bit identified by the faulty address 324, can be based on the address 314 being within a same memory portion 506 as the faulty address 324 (and thus remapped along with the faulty address 324 to be serviced by another memory portion of another memory block), and so forth.

Responsive to this determination, the controller logic 508 remaps at 512 the memory access request 328 at least partially to another memory portion of the second memory block 502-2 to produce a remapped memory access request 514. Here, the other memory portion (e.g., the second redundant memory portion 504-2) is designated to provide redundancy for one or more memory portions of the second memory block 502-2. The controller logic 508 can therefore transmit the remapped memory access request 514 to the second memory block 502-2. Examples of this transmission are described with reference to FIGS. 6 and 7.

Figure 6:
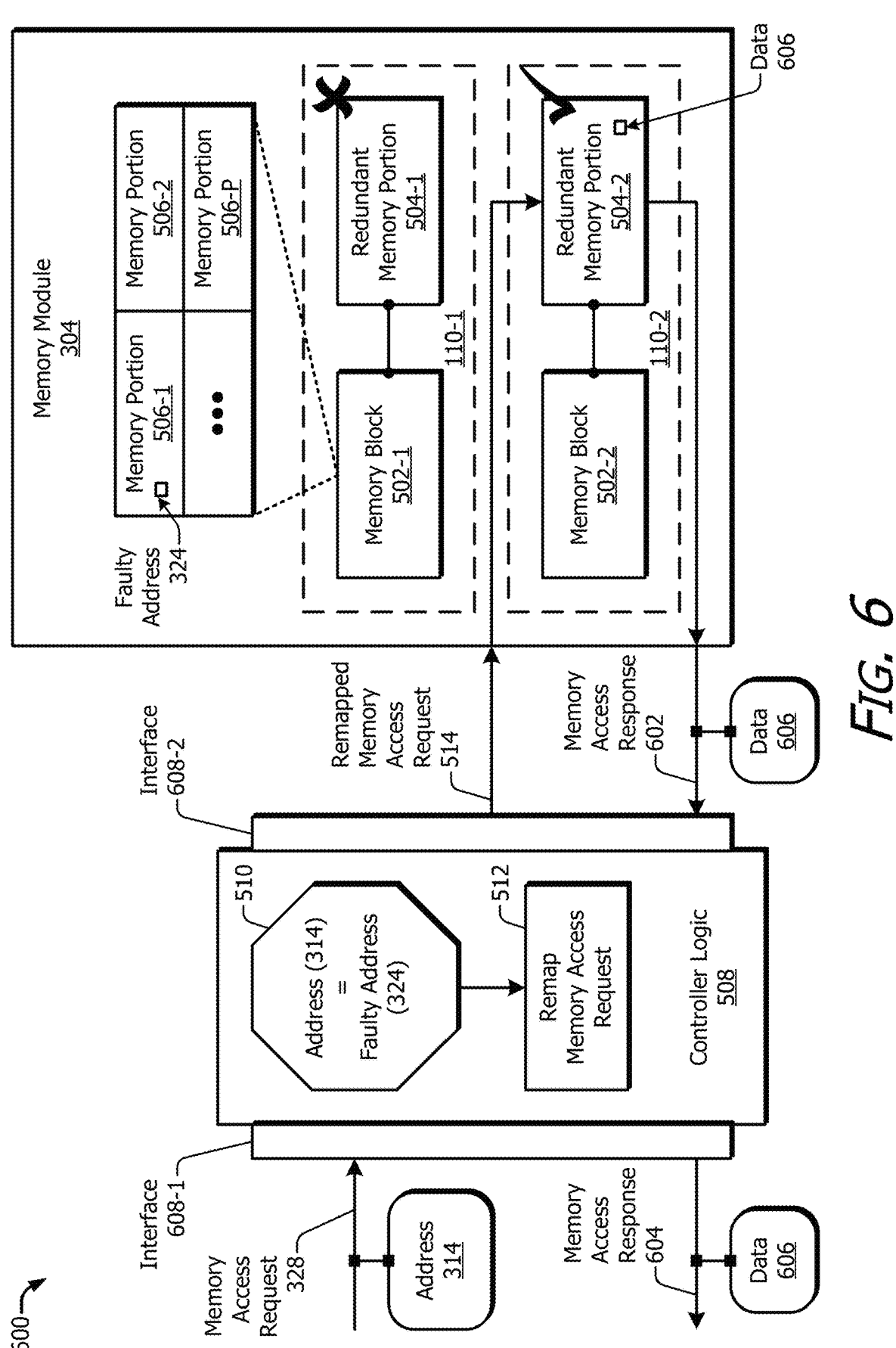
FIG. 6 illustrates example communication schemes for controller-level memory repair, which schemes can involve memory repair logic of a controller communicating with a memory module including multiple memory blocks.

FIG. 6 illustrates example communication schemes 600 for controller-level memory repair. The schemes 600 can involve controller logic 508 (e.g., a controller that includes memory repair logic) communicating with a memory module 304 including multiple memory blocks 502-1 . . . 502-B. FIG. 6 is similar to FIG. 5. However, in the example of FIG. 6, each memory block 502 corresponds to, and is disposed on, a different memory die 110. The first memory die 110-1 includes the first memory block 502-1, and the second memory die 110-2 includes the second memory block 502-2. Although only two memory blocks are explicitly shown, the memory module 304 may include more memory blocks (or a single memory block if the controller-level memory repair is implemented across multiple memory modules or within a single memory die but across multiple memory banks).

In example implementations, the controller logic 508 is coupled to (or includes) a first interface 608-1 and a second interface 608-2. The first interface 608-1 is also coupled upstream to another component, such as an upstream component like a processor or a link controller. The second interface 608-2 is also coupled downstream to multiple memory dies, like the first memory die 110-1 and the second memory die 110-2.

In example operations, the controller logic 508 receives a memory access request 328 including an address 314 via the first interface 608-1. The controller logic 508 determines at 510 that the address 314 corresponds to a faulty address 324 of a first memory block 502-1. The controller logic 508 remaps at 512 the memory access request 328 at least partially to a memory portion of a second memory block 502-2 to produce a remapped memory access request 514 responsive to the determination.

The memory portion of the second memory block 502-2 to which the remapping is directed (e.g., the second redundant memory portion 504-2) is designated to provide redundancy for one or more memory portions of the second memory block 502-2. As shown in this example, the first memory block 502-1 is integrated on the first memory die 110-1. The second memory block 502-2 and the second redundant memory portion 504-2, however, are disposed on the second memory die 110-2. The controller logic 508 transmits the remapped memory access request 514 via the second interface 608-2 to the second memory block 502-2 of the second memory die 110-2 to be serviced by the second redundant memory portion 504-2.

The controller logic 508 receives via the second interface 608-2 from the second memory block 502-2 a memory access response 602 including data 606 corresponding to the address 314 of the memory access request 328. The controller logic 508 also transmits the data 606 upstream via the first interface 608-1 to another component based on the receipt of the memory access request 328. The upstream transmission may be to a processor 114 (e.g., of FIG. 1), to a link controller 414 (e.g., of FIG. 4), and so forth. Thus, the controller logic 508 uses the second memory block 502-2, including at least one redundant memory portion 504 thereof, to service the memory access request 328 that targets a faulty memory location of the first memory block 502-1.

Figure 7:
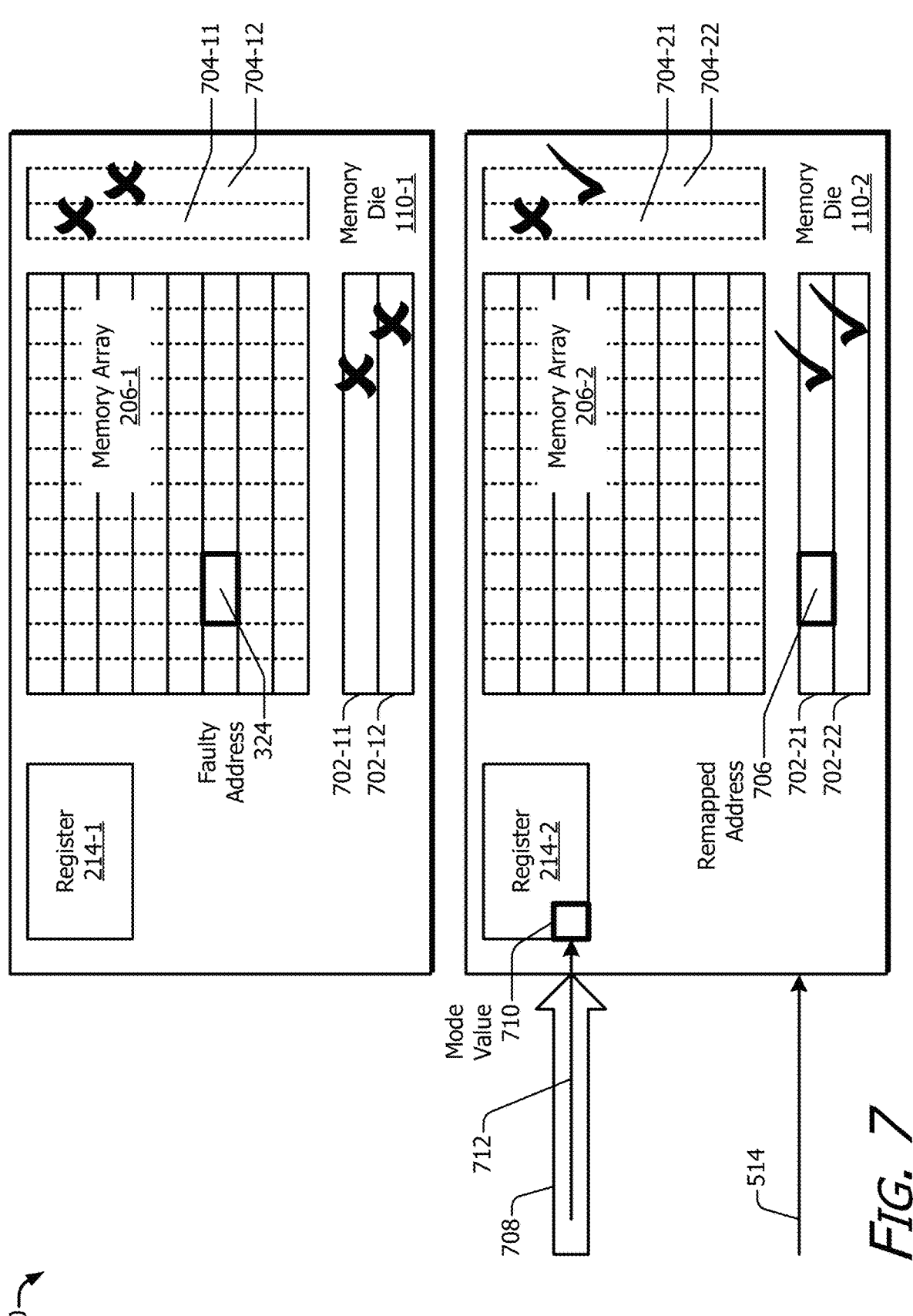
FIG. 7 illustrates example memory-side architectures for controller-level memory repair in which multiple memory blocks are realized with multiple memory dies and multiple memory portions are realized with multiple rows or multiple columns.

FIG. 7 illustrates example memory-side architectures 700 for controller-level memory repair in which multiple memory blocks are realized with multiple memory dies and multiple memory portions are realized with multiple rows or multiple columns. As depicted, the memory-side architectures 700 include a first memory die 110-1 and a second memory die 110-2. Each memory die 110 includes at least one register 214, at least one memory array 206, and multiple redundant memory portions in the forms of spare memory rows and spare memory columns.

The first memory die 110-1 includes a first register 214-1 and a first memory array 206-1. The first memory die 110-1 also includes a first redundant row 702-11, a second redundant row 702-12, a first redundant column 704-11, and a second redundant column 704-12. Further, the second memory die 110-2 includes a second register 214-2 and a second memory array 206-2. The second memory die 110-2 also includes a first redundant row 702-21, a second redundant row 702-22, a first redundant column 704-21, and a second redundant column 704-22. In the depicted example, the first redundant row 702-11, the second redundant row 702-12, the first redundant column 704-11, and the second redundant column 704-12 are unavailable, as indicated by the four "X" icons. Thus, the first memory array 206-1 has exhausted its two spare memory rows and two spare memory columns.

Although the first redundant column 704-21 of the second memory die 110-2 is unavailable (as indicated with an "X" icon), the first redundant row 702-21, the second redundant row 702-22, and the second redundant column 704-22 of the second memory array 206-2 are available, as indicated by the three "check-mark" icons. These two spare memory rows and one spare memory column are available for use to repair, via memory portion substitution, one or more faulty memory locations in the second memory array 206-2 or to be shared with the first memory die 110-1 to repair one or more faulty memory locations in the first memory array 206-1.

In example implementations, the first and second memory arrays 206-1 and 206-2 (or the first and second memory dies 110-1 and 110-2) correspond to first and second memory blocks 502-1 and 502-2 (e.g., of FIG. 5), respectively. The first and second redundant (or "spare") rows and the first and second redundant (or "spare") columns correspond to redundant memory portions 504 (e.g., of FIG. 5). Accordingly, the rows or columns of the memory arrays 206-1 and 206-2 can correspond to the memory portions 506 (e.g., also of FIG. 5). The memory array 206-1 includes a faulty address 324 of at least one failed memory cell. In this case, controller logic 508 (e.g., of FIG. 5) remaps the faulty address 324 of the first memory array 206-1 on the first memory die 110-1 to the first redundant row 702-21 of the second memory array 206-2 as a remapped address 706.

To issue a remapped memory access request 514 (e.g., of Fig.) to the remapped address 706, the controller logic 508 uses a repair indication 320 (e.g., of FIGS. 3 and 9) to access the data stored (or to be stored) at the memory location corresponding to the remapped address 706 of the first redundant row 702-21. The controller logic 508 can use any scheme to identify the first redundant row 702-21 of the second memory array 206-2 that can be processed by the second memory die 110-2. In some cases, the controller logic 508 causes the second memory die 110-2 to enter a particular operational mode (e.g., a repair mode or a test mode) that enables the first redundant row 702-21 to be accessible.

Such an operational mode can be activated via signaling to the second memory die 110-2. For example, the controller logic 508 can transmit to the second memory block 502-2—as implemented by the second memory array 206-2 or the second memory die 110-2—a signal 708 indicating that the remapped memory access request 514 is to be serviced using at least one redundant memory portion 504—as implemented by the first redundant row 702-21. For instance, the controller logic 508 may transmit a multipurpose command (MPC) to the second memory die 110-2. Additionally or alternatively, the controller logic 508 can write a value (e.g., a mode value 710) of one or more bits to the second register 214-2 (e.g., a mode register) to activate the operational mode that renders accessible the redundant memory portions. To do so, the controller logic 508 may transmit a command 712 to write at least one bit into a mode register to enable access to at least one redundant memory portion.

Figure 8:
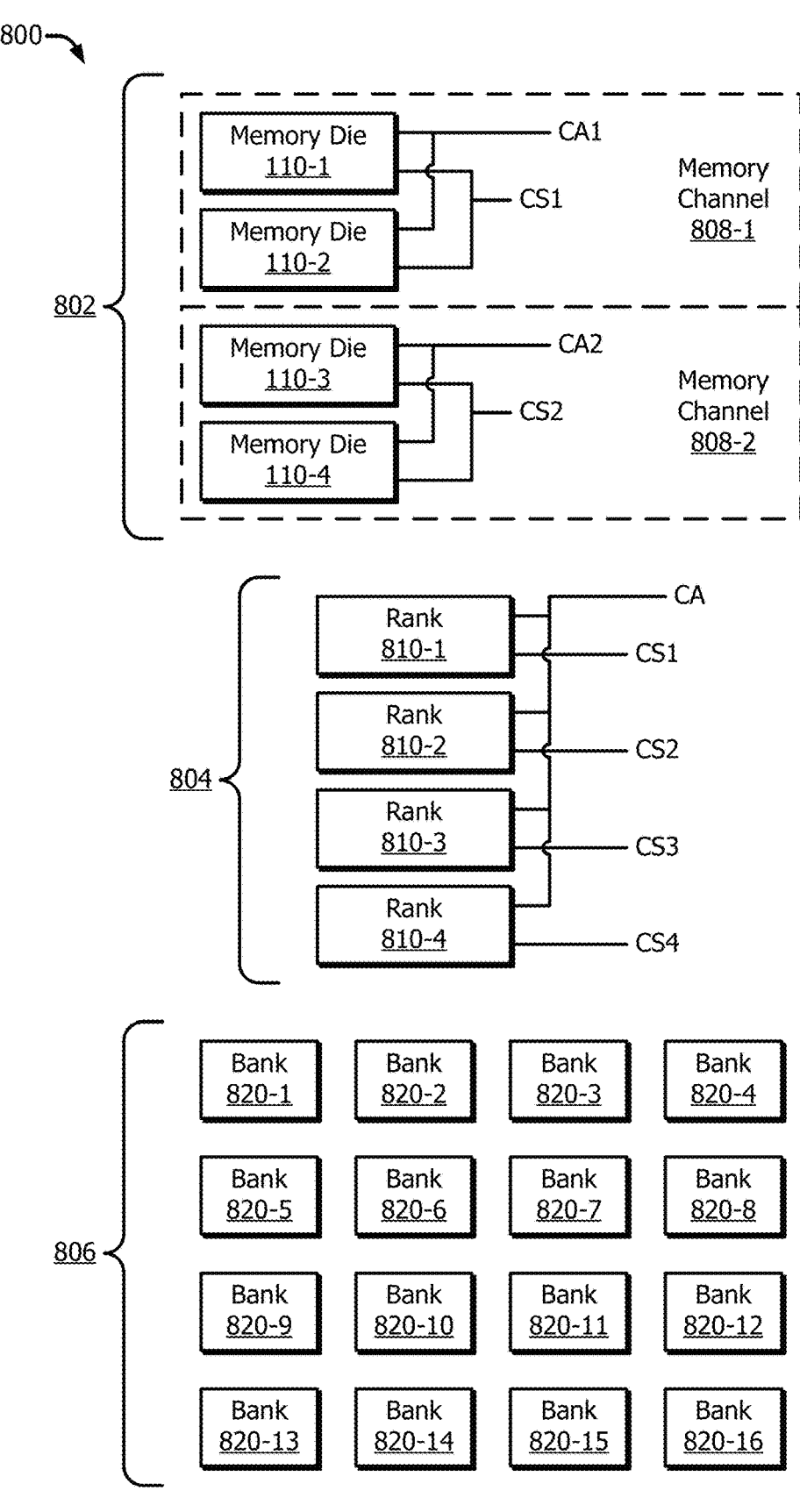
FIG. 8 illustrates example memory-side architectures for controller-level memory repair in which multiple memory blocks can be realized with multiple memory channels, multiple memory ranks, or multiple memory banks.

FIG. 8 illustrates example memory-side architectures 800 for controller-level memory repair. Multiple memory blocks 502-1 . . . 502-B (e.g., of FIG. 5) can respectively correspond to multiple memory dies 110-1 . . . 110-D (where "B=D"), as shown in FIGS. 6 and 7 by way of example. However, multiple memory blocks 502-1 . . . 502-B can be realized with respective sets of multiple memory channels at 802, multiple memory ranks at 804, or multiple memory banks 806.

In example implementations, as shown at 802, four memory dies 110-1 . . . 110-4 are separated into two channels: a first memory channel 808-1 and a second memory channel 808-2. The memory-channel implementation 802 is directed to a x16/2-channel memory architecture. Each respective memory channel 808-1 or 802-2 (CA1 or CA2) corresponds to a respective chip select (CS1 or CS2). Here, a controller can share the available redundant memory portions between the two memory channels 808-1 and 808-2 that respectively correspond to two memory blocks.

As shown at 804 for other example implementations, four memory ranks 810-1 . . . 810-4 are provided for one channel (CA). Each respective memory rank 810-1, 810-2, 810-3, and 810-4 corresponds to a respective chip select CS1, CS2, CS3, and CS4 in a memory-rank implementation 804. Here, a controller can share the available redundant memory portions between the four memory ranks 810-1 to 810-4 that respectively correspond to four memory blocks.

As shown at 806 for other example implementations, sixteen (16) memory banks 820-1 . . . 820-16 are provided on a single memory die 110 (not shown in FIG. 8). Each respective memory bank 820-1, 820-2, . . . , 820-15, and 820-16 corresponds to a respective set of 16 sets of redundant memory portions. Each bank 820 also has associated logic circuitry to remap, or redirect, an incoming memory request for a faulty address to a spare memory row or a spar memory column of the bank's respective set of redundant memory portions. The banks do not have, however, circuitry or logic to redirect an incoming memory request to a spare memory row or a spare memory column that is associated with a different bank 820.

As described herein, however, for an example memory-bank implementation 806, a controller can share the available redundant memory portions between the 16 memory banks 820-1 to 820-16 that respectively correspond to 16 memory blocks. For example, a controller can remap a memory access request that targets a faulty address in bank 820-6, which has no remaining available spare rows or columns, to a spare row or column of another bank (e.g., bank 820-5 or bank 820-14) that does have at least one available redundant memory portion.

Figure 9:
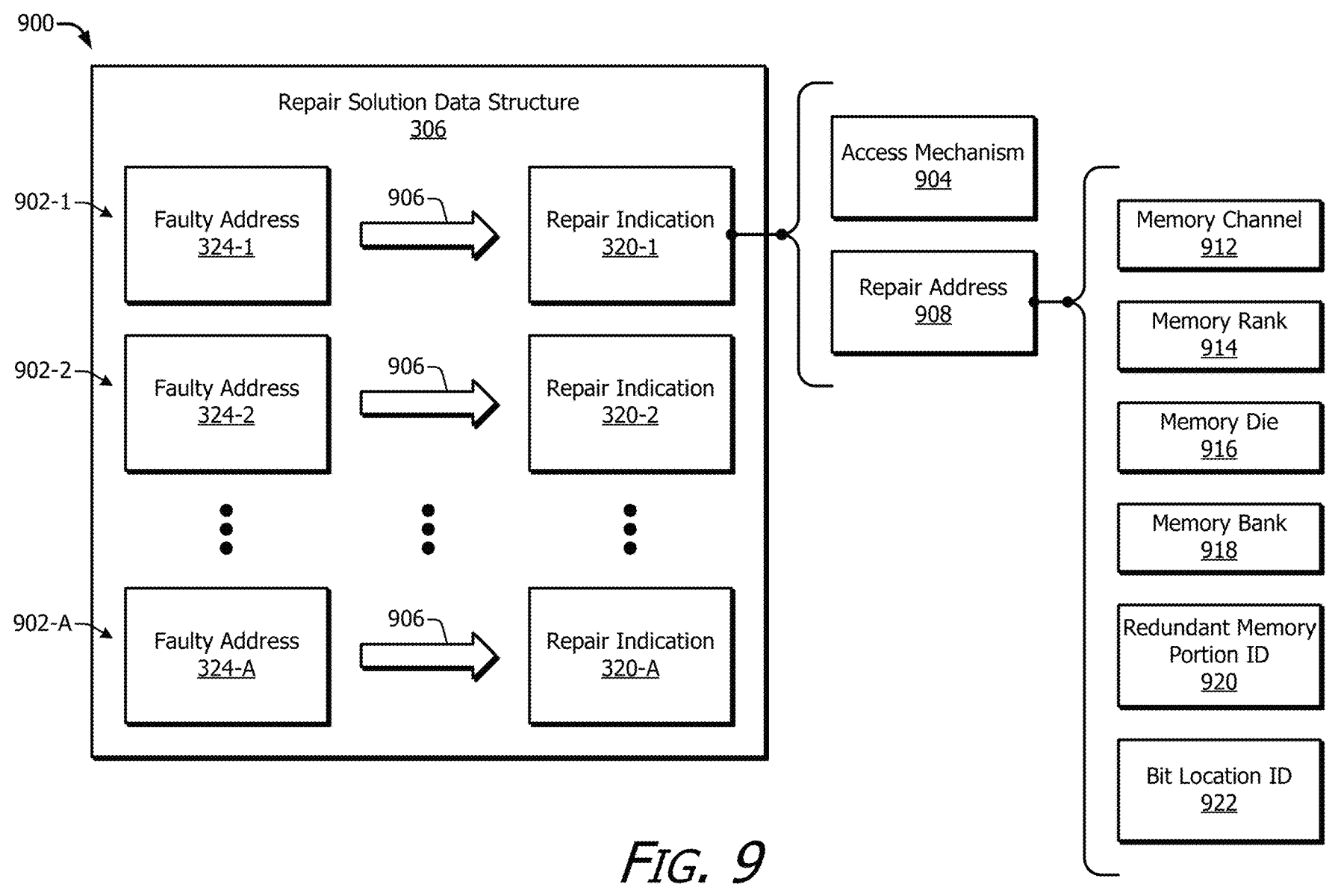

FIG. 9 illustrates examples of a data structure 306 that can represent one or more inter-memory-block repair solutions by mapping faulty addresses to respective repair indications. As shown, the repair solution data structure 306 includes multiple entries 902-1 . . . 902-A, where "A" represents a positive integer. A first entry 902-1, a second entry 902-2 . . . , an "Ath" entry 902-A are explicitly depicted. In some cases, the repair solution data structure 306 may include as many entries 902-1 to 902-A as there are faulty addresses that the controller has been informed exist and have no current memory-block-level repair capability.

In example implementations, each entry 902 of the multiple entries 902-1, 902-2, . . . , 902-A respectively includes a faulty address 324 of multiple faulty addresses 324-1, 324-2, . . . , 324-A. Each entry 902 of the multiple entries 902-1, 902-2, . . . , 902-A can also respectively include a repair indication 320 of multiple repair indications 320-1, 320-2, . . . , 320-A. Thus, each entry 902 can map a respective faulty address 324 to a respective repair indication 320. However, a repair solution data structure 306 can be organized differently. For example, faulty addresses that are mapped to a same redundant memory portion (e.g., a same spare memory row) may have at least partly a same repair indication 320, so the overlapping portion of the repair indication 320 may be shared to avoid duplication. Further, such faulty addresses may be grouped together or combined into a same entry 902 or merged into a set of entries.

Examples of repair indications are described above with reference to FIGS. 3, 7, and 8. Additionally or alternatively, a repair indication 320 may include an access mechanism 904. In some cases, the access mechanism 904 can include how a redundant memory portion is accessed, such as an operational mode. In other cases, the access mechanism 904 may be omitted from the repair solution data structure 306, or at least from individual entries of the data structure 306 if each faulty address uses a common access mechanism 904 that is "baked into" the controller logic.

A repair indication 320 can also include other indications, including one or more bits that address a memory block or a part of a memory system or module. Examples of addressing indications include those pertaining to a memory channel 912, a memory rank 914, a memory die 916, a memory bank 918, some combination thereof, and so forth. Further, addressing indications may include at least one redundant memory portion identification (ID) 920 to identify (or to provide an ID of) a redundant memory portion from multiple redundant memory portions that are part of a same memory block.

The addressing indications may additionally include at least one bit location ID 922 that identifies a place along a redundant memory portion (e.g., along a spare row or a spare column) at which data is stored or to be stored instead of at the faulty memory location of a memory array of another memory block. In some cases, the bit location ID 922 may be the same bits as from the faulty address in terms of offset or column select bits (e.g., for a spare-memory-row implementation). Also, a repair indication 320 may include more, fewer, or different memory access information than what is shown in FIG. 9 and described above.

Particular circuit implementations and hardware environments have been illustrated in the accompanying figures and described above. Nonetheless, the principles described with reference to FIGS. 1 to 9, as well as other figures described below, are applicable to other types of memory devices, communication exchanges, and/or environments. Although certain concepts are described herein in the context of DRAM (e.g., LPDDR5 SDRAM), the described techniques can be applied to other memory device types or standards. Also, although certain concepts are described herein in the context of CXL Type 3 devices ("Memory Expanders"), the described techniques can be applied to other CXL device types and/or to non-CXL devices.

Example Methods

Figure 10:
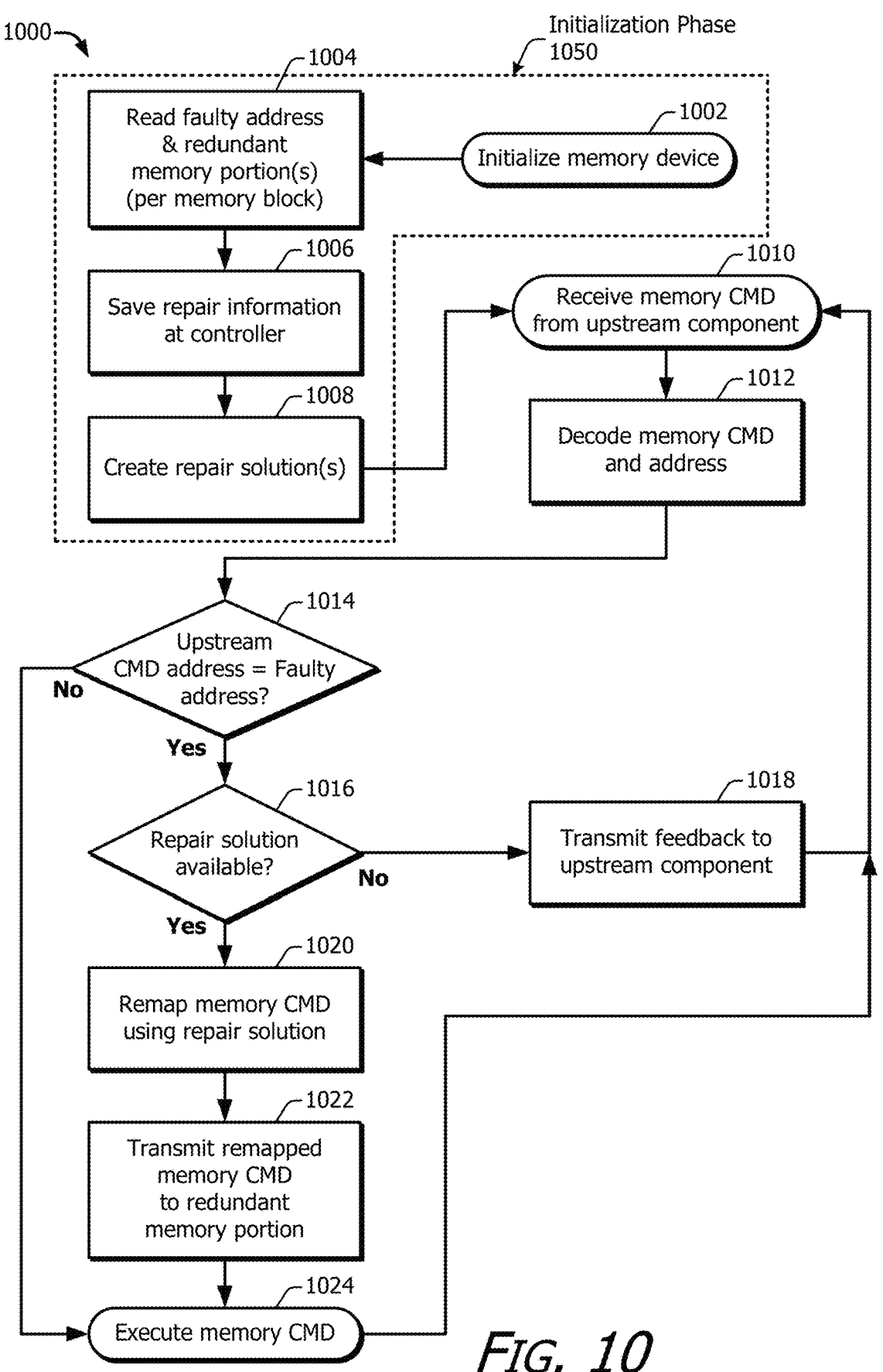
FIG. 10 illustrates a flow chart for example methods of performing controller-level memory repair by a controller and corresponding memory subsystem.

This section describes example methods with reference to the flow chart and flow diagram of FIGS. 10 and 11 for implementing aspects of controller-level memory repair. These descriptions may also refer to components, entities, and other aspects depicted in FIGS. 1 to 9, which reference is made only by way of example.

FIG. 10 illustrates a flow chart for example methods 1000 of performing controller-level memory repair by a controller and associated memory. Controller examples include a memory controller 118 (of FIG. 1), a controller 302 (of FIG. 3), a memory controller 408 (of FIG. 4), or a controller 420 or 422 (also of FIG. 4). The flow diagram includes twelve (12) blocks 1002-1024. The flow chart includes an initialization phase 1050 with four blocks 1002-1008. The initialization phase 1050 can be performed each time a device is powered on. Alternatively, the initialization phase 1050 may be performed at regular intervals, responsive to a detected memory error, as part of a routine or a user-prompted diagnostic action, and so forth.

At 1002, the flow chart starts by initializing a memory device 108. At 1004, a controller 302 reads one or more faulty addresses 324 and at least one available redundant memory portion 504 from multiple memory blocks 502-1 . . . 502-B on a per-memory block 502 basis. At 1006, the controller 320 saves this repair information 128. At 1008, the controller 302 creates one or more repair solutions. The repair solutions can be stored, for instance, in a repair solution data structure 306. Each repair solution can map a faulty address 324 to a repair indication 320 that shares an available redundant memory portion 504 from a second memory block 502-2 with a first memory block 502-1 that has a faulty memory location that is not repairable by a redundant memory portion 504 of the first memory block 502-1.

Example parts of post-initialization memory operation, in which a memory subsystem services memory access requests while implementing aspects of controller-level memory repair, are represented by eight (8) blocks 1010-1024. At 1010, the controller 302 receives a memory access request or command (CMD) 328 from an upstream component, such as a processor or another controller. At 1012, the controller 302 decodes the memory command 312 and an address 314 thereof using a command decoder 316 and an address decoder 318.

At 1014, the controller 302 determines if the upstream memory command address 314 corresponds (e.g., at least partially matches) a faulty address 324. If not, then the memory device 108 can execute the memory command at 1024. On the other hand, if the address 314 does correspond to a faulty address 324 (as determined at 1014), then at 1016 the controller 302 determines if a repair solution is available. The controller 302 may, for instance, determine if the repair solution data structure 306 includes a repair indication 320 linked to the corresponding faulty address 324. If not, then the controller 302 at 1018 can transmit feedback information to the upstream component—e.g., to inform the component that the address 314 is unusable. This can occur if, for example, there is no available redundant memory portion 504 that can be shared with the first memory block 502-1 having the unrepaired faulty address 324. The controller 302 can then await at 1010 another memory command from the upstream component.

If, on the other hand, the controller 302 can determine a repair solution (at 1016), then at 1020 the controller 302 remaps the memory access request or command 328 using the repair solution. For example, from a repair solution data structure 306, the controller 302 can extract a repair indication 320 that is linked to the corresponding faulty address 324. The repair indication 320 provides information for accessing the redundant memory portion 504 of a different memory block 502, such as the second memory block 502-2. The information may include an access mechanism 904 or a repair address 908.

At 1022, the controller 302 transmits a remapped memory access request or command 514 to the redundant memory portion 504 that is associated with the faulty address 324, such as at the second memory block 502-2. The transmission may include signaling that establishes an operational mode enabling direct or specified access to the redundant memory portion 504. At 1024, a memory die 110 including the second memory block 502-2 of the memory device 108 executes the memory command by reading or writing data and returning the corresponding response, such as a the read data or a successful-write acknowledgment. The controller 302 can then await another memory command at 1010. Other implementations may have more, fewer, different, and/or reordered operations.

FIG. 11 illustrates a flow diagram for example processes 1100 that implement aspects of controller-level memory repair from the perspective of a controller. Controller examples include a memory controller 118 (of FIG. 1), a controller 302 (of FIG. 3), a memory controller 408 (of FIG. 4), or a controller 420 or 422 (also of FIG. 4). The processes 1100 can include blocks 1102-1108.

At block 1102, a memory access request including an address is received. For example, a controller 302 can receive a memory access request 328 including an address 314. For instance, the controller 302 may receive a memory command 312 that targets the address 314 from an upstream component, such as a processor 114 of a host device 104 or another controller 420 or 422.

At block 1104, it is determined that the address corresponds to a faulty address of a first memory block. For example, the controller 302 can determine that the address 314 corresponds to a faulty address 324 of a first memory block 502-1. To do so, the controller 302 may determine that the address 314 of the memory access request 328 at least partially matches (e.g., the bits that point to or address a memory location that is declared faulty match) a faulty address 324 in a data structure of faulty addresses, such as a repair solution data structure 306.

At block 1106, the memory access request is remapped at least partially to a memory portion of a second memory block to produce a remapped memory access request responsive to the determining, with the memory portion of the second memory block designated to provide redundancy for one or more memory portions of the second memory block. For example, the controller 302 can remap the memory access request 328 at least partially to a memory portion (e.g., a memory row or a memory column) of a second memory block 502-2 to produce a remapped memory access request 514 responsive to the determining. The memory portion of the second memory block 502-2 (e.g., a redundant memory portion 504-2) can be designated to provide redundancy for one or more memory portions 506-1 . . . 506-P of the second memory block 502-2. In some cases, the remapped memory access request 514 may include an address with one or more bits identifying the second memory block 502-2 in terms of die, channel, rank, bank, and so forth. The remapped memory access request 514 may also implicitly or explicitly include an access mechanism 904, such as a particular operational mode, that enables the controller 302 to specify the redundant memory portion 504-2 instead of a "main" memory array 206 of the second memory block 502-2.

At block 1108, the remapped memory access request is transmitted to the second memory block. For example, the controller 302 can transmit the remapped memory access request 514 to the second memory block 502-2. This may be performed by signaling to the second memory block 502-2 over at least one bus that the remapped memory access request 514 is to be serviced using the redundant memory portion 504-2. This signaling may include writing at least one bit into a mode register to enable access to the redundant memory portion 504-2.

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses, components, or other aspects shown in FIGS. 1 to 9, the components or aspects of which may be further divided, combined, rearranged, and so on. The devices and components of these figures generally represent hardware, such as electronic devices, packaged modules, IC chips, or circuits: firmware or the actions thereof: software: or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Although implementations for controller-level memory repair have been described in language specific to certain features and/or methods, the subject of the appended claims is not necessarily limited to the specific features or methods described. Rather, the specific features and methods are disclosed as example implementations for controller-level memory repair.

What is claimed is:

1. A method by a controller, the method comprising:
receiving a memory access request including an address;
determining that the address corresponds to a faulty address of a first memory die, the faulty address targeting a memory location including at least one faulty bit of the first memory die;
remapping the memory access request at least partially to a memory portion of a second memory die to produce a remapped memory access request responsive to the determining, the memory portion of the second memory die designated to provide redundancy for repairing at least one faulty address of one or more memory portions of the second memory die; and
transmitting to the second memory die the remapped memory access request based on the address of the memory access request and the memory location including the at least one faulty bit of the first memory die, the remapped memory access request targeting the memory portion that is designated to provide redundancy for repairing the at least one faulty address of the one or more memory portions of the second memory die.

2. The method of claim 1, further comprising:
receiving from the second memory die a memory access response including data corresponding to the address of the memory access request; and
transmitting the data upstream based on the receiving of the memory access request.

3. The method of claim 1, further comprising, prior to performing the remapping:
receiving from the first memory die at least one first indication that the first memory die has no redundant memory portions available for memory repair; and
receiving from the second memory die at least one second indication that the second memory die has at least one redundant memory portion available for memory repair, the at least one redundant memory portion including the memory portion of the second memory die designated to provide redundancy for repairing the at least one faulty address of the one or more memory portions of the second memory die.

4. The method of claim 3, further comprising:
producing at least one data structure that indicates one or more redundant memory portions that can be shared from one memory die to another memory die based on the at least one first indication and the at least one second indication; and
remapping the memory access request at least partially to the memory portion of the second memory die to produce the remapped memory access request using the at least one data structure.

5. The method of claim 3, further comprising, prior to performing the remapping:
transmitting to the first memory die a first request for one or more indications of at least one faulty memory location in the first memory die and at least a quantity of available redundant memory portions of the first memory die; and
transmitting to the second memory die a second request for one or more indications of at least one faulty memory location in the second memory die and at least a quantity of available redundant memory portions of the second memory die.

6. The method of claim 1, further comprising:

determining that the address of the memory access request corresponds to the faulty address of the first memory die based on the address of the memory access request and the faulty address of the first memory die at least partially matching.

7. The method of claim 1, wherein the controller comprises a memory controller, the method further comprising:

receiving, by the memory controller, the memory access request from a link controller that is configured to operate in accordance with at least one version of a Compute Express Link™ (CXL) protocol; and transmitting, by the memory controller, data corresponding to the address of the memory access request upstream to the link controller based on the receiving of the memory access request from the link controller.

8. The method of claim 1, further comprising:

transmitting to the second memory die a signal indicating that the remapped memory access request is to be serviced using at least one redundant memory portion.

9. The method of claim 8, further comprising:

transmitting to the second memory die a command to write at least one bit into a mode register to enable access to the at least one redundant memory portion.

10. An apparatus comprising:

an interface configured to be coupled to at least one bus that provides access to multiple memory dies; and controller logic coupled to the interface; the controller logic configured to:

determine that an address of a memory access request corresponds to a faulty address of a first memory portion of a first memory die of the multiple memory dies, the faulty address targeting a memory location including at least one faulty bit of the first memory die;

remap the memory access request at least partially to a second memory portion of a second memory die of the multiple memory dies to produce a remapped memory access request responsive to the determination, the second memory portion of the second memory die designated to provide redundancy for repairing at least one faulty address of one or more memory portions of the second memory die; and transmit to the second memory die the remapped memory access request based on the address of the memory access request and the memory location including the at least one faulty bit of the first memory die, the remapped memory access request targeting the second memory portion that is designated to provide redundancy for repairing the at least one faulty address of the one or more memory portions of the second memory die.

11. The apparatus of claim 10, wherein the controller logic is configured to:

receive from the first memory die one or more first indications of at least one faulty memory location in the first memory die and one or more second indications that the first memory die has no available redundant memory portions, the at least one faulty memory location corresponding to the faulty address of the first memory portion of the first memory die, the at least one faulty memory location comprising the memory location including the at least one faulty bit of the first memory die; and receive from the second memory die one or more third indications of at least a quantity of one or more available redundant memory portions of the second memory die, the quantity greater than zero.

12. The apparatus of claim 11, further comprising:

at least one data structure that includes:

an entry comprising the faulty address of the first memory portion of the first memory die mapped to a repair indication including at least a portion of a repair address that identifies the second memory portion of the second memory die, wherein the controller logic is configured to generate the at least one data structure based on the one or more first indications, the one or more second indications, and the one or more third indications.

13. The apparatus of claim 10, wherein the controller logic is configured to:

transmit a command to write at least one bit into a mode register to enable access to at least one redundant memory portion including the second memory portion of the second memory die.

14. The apparatus of claim 10, wherein:

the first memory portion comprises at least one of a memory row or a memory column of a first memory array of the first memory die; and the second memory portion comprises at least one of a spare memory row or a spare memory column of a second memory array of the second memory die.

15. The apparatus of claim 10, wherein:

the first memory die and the second memory die are each part of at least one of different memory channels or different memory ranks.

16. The apparatus of claim 10, wherein:

the memory location including the at least one faulty bit of the first memory die comprises a faulty memory location of the first memory die; and the faulty address is configured to identify the faulty memory location of the first memory portion of the first memory die of the multiple memory dies.

17. The apparatus of claim 16, wherein:

the first memory portion comprises a memory row of the first memory die;

the faulty address comprises a row address of the memory row;

the faulty memory location comprises the at least one faulty bit, which is part of the memory row; and the second memory portion comprises a spare memory row of the second memory die.

18. The apparatus of claim 10, further comprising:

the at least one bus;

the multiple memory dies coupled to the at least one bus; and front-end logic coupled to the controller logic and configured to:

be coupled to a bus that is external to the apparatus; and receive the memory access request via the bus that is external to the apparatus.

19. The apparatus of claim 18, wherein:

the front-end logic is configured to comport with at least one version of a Compute Express Link™ (CXL) standard; and the apparatus comprises a CXL memory device.

20. An apparatus comprising:

a first interface configured to be coupled upstream to a component;

a second interface configured to be coupled downstream to multiple memory dies, the multiple memory dies comprising a first memory die and a second memory die; and controller logic coupled to the first interface and the second interface, the controller logic configured to:

receive from the component a memory access request including an address targeting a memory location of the first memory die, the memory location including at least one faulty bit; and transmit to the second memory die a remapped memory access request based on the address of the memory access request and the memory location including the at least one faulty bit, the remapped memory access request targeting a memory portion that is designated to provide redundancy for repairing a faulty address of one or more memory portions of the second memory die.

* * * * *